(12) United States Patent
Carstens et al.

(10) Patent No.: US 10,431,029 B2
(45) Date of Patent: *Oct. 1, 2019

(54) ACCESS CONTROL SYSTEM

(71) Applicants: Deutsche Post AG, Bonn (DE); Kobil Systems GmbH, Worms (DE); Fraunhofer-Gesellschaft zur Förderung der angewandten Forschung e.V., München (DE)

(72) Inventors: Christian Carstens, Windhagen (DE); Christoph Dautz, Bonn (DE); Jochen Jansen, Bonn (DE); Ramin Benz, Bonn (DE); Alexandra Dmitrienko, Darmstadt (DE); Stanislav Bulygin, Filderstadt (DE); Marcus Lippert, Pfungstadt (DE)

(73) Assignee: Deutsche Post AG, Bonn (DE)

( * ) Notice: Subject to any disclaimer, the term of this patent is extended or adjusted under 35 U.S.C. 154(b) by 0 days.

This patent is subject to a terminal disclaimer.

(21) Appl. No.: 15/884,635

(22) Filed: Jan. 31, 2018

(65) Prior Publication Data
US 2018/0151013 A1    May 31, 2018

Related U.S. Application Data

(63) Continuation of application No. 15/162,314, filed on May 23, 2016, now Pat. No. 9,940,768, which is a
(Continued)

(30) Foreign Application Priority Data

Dec. 5, 2013 (DE) ......................... 10 2013 113 554
Apr. 11, 2014 (DE) ......................... 10 2014 105 243

(51) Int. Cl.
*G07C 9/00* (2006.01)
*H04W 56/00* (2009.01)
(Continued)

(52) U.S. Cl.
CPC ....... *G07C 9/00896* (2013.01); *A47G 29/141* (2013.01); *A47G 29/16* (2013.01);
(Continued)

(58) Field of Classification Search
CPC ............ G07C 9/00023; G07C 9/00126; G07C 9/0182; G07C 9/00896; G07C 9/00309; E05B 43/005; H04L 9/00
See application file for complete search history.

(56) References Cited

U.S. PATENT DOCUMENTS

| 4,894,717 A | 1/1990 | Komei |
| 5,061,923 A | 10/1991 | Miller et al. |

(Continued)

FOREIGN PATENT DOCUMENTS

| CN | 102682506 A | 9/2012 |
| CN | 203242049 U | 10/2013 |

(Continued)

OTHER PUBLICATIONS

Elaine Barker et al., Special Publication 800-133 Recommendation for Cryptographic Key Generation, Dec. 2012, 26 pages, National Institute of Standards and Technology (NIST) U.S. Department of Commerce, Gaithersburg, MD.
(Continued)

*Primary Examiner* — Nabil H Syed
(74) *Attorney, Agent, or Firm* — Reinhart Boerner Van Deuren P.C.

(57) ABSTRACT

Provided is a method for access control, performed by an access control apparatus, including obtaining access authorization information that is communicated to the access control apparatus having at least one access authorization parameter and first check information; using at least the communicated access authorization parameters, the communicated first check information and a second key from a key
(Continued)

pair, which second key is stored in the access control apparatus, to perform a first check on whether the communicated first check information has been produced by performing cryptographic operations by means of access authorization parameters corresponding to the communicated access authorization parameters using at least one first key from the key pair, and deciding whether access can be granted, based on the first check delivers a positive result and it is established that at least one predefined set of the communicated access authorization parameters respectively provides access authorization.

20 Claims, 8 Drawing Sheets

Related U.S. Application Data continuation of application No. PCT/EP2014/076554, filed on Dec. 4, 2014.

(51) Int. Cl.

| | | |
|---|---|---|
| H04L 29/06 | (2006.01) | |
| G06F 1/12 | (2006.01) | |
| H04L 9/08 | (2006.01) | |
| G06F 1/24 | (2006.01) | |
| H04W 12/08 | (2009.01) | |
| H04W 4/80 | (2018.01) | |
| A47G 29/14 | (2006.01) | |
| A47G 29/16 | (2006.01) | |
| G07F 17/12 | (2006.01) | |
| G06Q 10/08 | (2012.01) | |
| H04L 9/32 | (2006.01) | |
| H04L 9/00 | (2006.01) | |
| E05B 43/00 | (2006.01) | |
| E05B 65/00 | (2006.01) | |
| E05B 47/00 | (2006.01) | |
| E05B 65/52 | (2006.01) | |
| E05C 9/08 | (2006.01) | |
| E05C 9/18 | (2006.01) | |
| H04L 9/14 | (2006.01) | |
| H04L 9/30 | (2006.01) | |
| G06F 1/10 | (2006.01) | |
| G06F 21/31 | (2013.01) | |
| H04L 7/00 | (2006.01) | |
| G06F 1/04 | (2006.01) | |
| H04L 9/06 | (2006.01) | |

(52) U.S. Cl.
CPC ........ *E05B 43/005* (2013.01); *E05B 47/0001* (2013.01); *E05B 65/0003* (2013.01); *E05B 65/0078* (2013.01); *E05B 65/5246* (2013.01); *E05C 9/08* (2013.01); *E05C 9/18* (2013.01); *G06F 1/10* (2013.01); *G06F 1/12* (2013.01); *G06F 1/24* (2013.01); *G06F 21/31* (2013.01); *G06Q 10/083* (2013.01); *G06Q 10/0836* (2013.01); *G07C 9/00* (2013.01); *G07C 9/00111* (2013.01); *G07C 9/00119* (2013.01); *G07C 9/00182* (2013.01); *G07C 9/00309* (2013.01); *G07C 9/00817* (2013.01); *G07C 9/00904* (2013.01); *G07C 9/00912* (2013.01); *G07F 17/12* (2013.01); *H04L 7/0012* (2013.01); *H04L 9/00* (2013.01); *H04L 9/08* (2013.01); *H04L 9/0819* (2013.01); *H04L 9/14* (2013.01); *H04L 9/302* (2013.01); *H04L 9/3242* (2013.01); *H04L 9/3247* (2013.01); *H04L 9/3249* (2013.01); *H04L 63/045* (2013.01); *H04L 63/062* (2013.01); *H04L 63/10* (2013.01); *H04W 4/80* (2018.02); *H04W 12/08* (2013.01); *H04W 56/001* (2013.01); *A47G 2029/149* (2013.01); *G06F 1/04* (2013.01); *G07C 2009/0092* (2013.01); *G07C 2009/00373* (2013.01); *G07C 2009/00412* (2013.01); *G07C 2009/00468* (2013.01); *G07C 2009/00642* (2013.01); *G07C 2209/08* (2013.01); *G07C 2209/63* (2013.01); *G07C 2209/64* (2013.01); *H04L 9/0637* (2013.01); *H04L 9/088* (2013.01); *H04L 2209/805* (2013.01)

(56) References Cited

U.S. PATENT DOCUMENTS

| | | | |
|---|---|---|---|
| 5,768,379 A | 6/1998 | Girault et al. | |
| 5,845,843 A | 12/1998 | Kuller | |
| 6,895,507 B1 | 5/2005 | Teppler | |
| 2006/0219778 A1* | 10/2006 | Komatsu | H04L 63/06 235/382 |

FOREIGN PATENT DOCUMENTS

| | | | |
|---|---|---|---|
| DE | 102 02 802 A1 | 9/2003 | |
| DE | 102 38 342 A1 | 3/2004 | |
| DE | 20 2007 016 622 U1 | 5/2008 | |
| DE | 20 2011 101 134 U1 | 9/2011 | |
| DE | 20 2012 012 010 U1 | 3/2013 | |
| EP | 1 024 239 A1 | 8/2000 | |
| EP | 1 152 376 A2 | 11/2001 | |
| EP | 1 277 632 A2 | 1/2003 | |
| EP | 2 595 341 A1 | 5/2013 | |
| EP | 2595341 A1 * | 5/2013 | ......... G07C 9/00023 |
| GB | 2 276 023 A | 9/1994 | |
| GB | 2 302 976 A | 2/1997 | |
| GB | 2 352 073 A | 1/2001 | |
| GB | 2 352 314 A | 1/2001 | |
| GB | 2 364 097 A | 1/2002 | |
| WO | WO 01/30213 A2 | 5/2001 | |
| WO | WO 02/097605 A1 | 12/2002 | |
| WO | WO 2007/084357 A2 | 7/2007 | |

OTHER PUBLICATIONS

JH. Song et al., Request for Comments (RFC) Document 4493, the AES-CMAC Algorithm, Jun. 2006, 20 pages, Network Working Group, The Internet Society, WA.

H. Krawczyk et al., Request for Comments (RFC) Document 2104, HMAC: Keyed-Hashing for Message Authentication, Feb. 1997, 11 pages, Network Working Group, NY.

* cited by examiner

ACCESS CONTROL SYSTEM

CROSS-REFERENCE TO RELATED PATENT APPLICATIONS

This patent application is a Continuation of U.S. patent application Ser. No. 15/162,314, filed May 23, 2016, which is a Continuation of PCT/EP2014/076554, filed Dec. 4, 2014, which claims priority to German Application No. 10 2013 113 554.4, filed Dec. 5, 2013, and German Application No. 10 2014 105 243.9, filed Apr. 11, 2014, the entire teachings and disclosure of which are incorporated herein by reference thereto.

FIELD

Exemplary embodiments of the invention relate to an access control system, the components thereof and methods performed by said components. Exemplary embodiments of the invention relate, in particular, to a system for controlling access to parcel or goods delivery containers by different persons.

BACKGROUND

Access control systems find application in many different ways, for example for controlling access of persons to rooms of a building, as is the case for example in hotels, office complexes or laboratories, to events, or else in abstract form to functions, resources or services, for example computer functions or resources or server services.

A specific application of access control systems is also constituted by controlling access of persons to openings of containers, such as e.g. lockboxes or goods delivery containers, in particular parcel boxes. Parcel boxes enable a new form of delivery/retrieval of parcels for persons who want to receive or send parcels even when they are away from their residence, or in the vicinity of their residence. For this purpose, parcel boxes are usually installed in front of the residence of the parcel box user—in a manner similar to a mailbox, but with a larger capacity—and parcels are then delivered by the deliverer by insertion into the parcel box or are retrieved by withdrawal from the parcel box. In order to prevent misuse and theft, the parcel box must have a lock. Both the deliverer and the parcel box user must then be equipped with physical or logical keys in order to be able to use the parcel box.

SUMMARY OF SOME EXEMPLARY EMBODIMENTS OF THE INVENTION

To date there has been no satisfactory access control system for an installation of a plurality of parcel boxes which makes it possible for the boxes to operate without a network link—that is to say offline—and for secure and flexible granting of parcel box access authorizations both to the deliverers and to the parcel box users nevertheless to be ensured.

The present invention has therefore set itself the object of overcoming this problem.

A first aspect of the invention discloses a method for access control, performed by an access control apparatus, the method comprising
  obtaining access authorization information communicated to the access control apparatus and comprising at least one or more access authorization parameters and first check information,
  first checking, using at least the communicated access authorization parameters, the communicated first check information and a second key of a symmetrical or asymmetrical key pair, said second key being stored in the access control apparatus, as to whether the communicated first check information was generated by performing cryptographic operations on access authorization parameters corresponding to the communicated access authorization parameters using at least a first key of the key pair,
  deciding whether access is permitted to be granted, wherein necessary conditions for granting access are that the first checking yields a positive result and that it is determined that at least one predefined set of the communicated access authorization parameters, in view of respective pieces of reference information present in the access control apparatus at least at the time of the first checking, respectively authorize for access.

The first aspect of the invention further discloses the use of an access authorization proving apparatus for communicating access authorization information to the access control apparatus in accordance with the first aspect of the invention.

A second aspect of the invention discloses a method for generating access authorization information, in particular performed by an access authorization generation apparatus, the method comprising
  generating first check information by performing cryptographic operations on one or more access authorization parameters using at least a first key of a symmetrical or asymmetrical key pair,
  generating access authorization information comprising at least the one or the plurality of access authorization parameters and the first check information, and
  outputting the access authorization information for storage on an access authorization proving apparatus configured to communicate the access authorization information to at least one access control apparatus in order to enable the latter to decide whether access is permitted to be granted on the basis of the communicated access authorization information, wherein necessary conditions for granting access are that a first checking, using at least the communicated access authorization parameters, the communicated first check information and a second key of the key pair, said second key being stored in the access control apparatus, whether the communicated first check information was generated by performing cryptographic operations on access authorization parameters corresponding to the communicated access authorization parameters using at least the first key of the key pair, yields a positive result and it is determined that at least one predefined set of the communicated access authorization parameters, in view of respective pieces of reference information present in the access control apparatus at least at the time of the first checking, respectively authorize for access.

A third aspect of the invention discloses a method for proving an access authorization, performed by an access authorization proving apparatus, the method comprising:
  communicating access authorization information comprising at least one or more access authorization parameters and first check information to an access control apparatus in order to enable the latter to decide whether access is permitted to be granted on the basis of the communicated access authorization information, wherein necessary conditions for granting access are that a first checking, using at least the communicated access authorization parameters, the communicated first check information and a second key of a symmetrical or asymmetrical key pair, said second key being stored in the access control apparatus, whether the communicated first check information was generated by performing cryptographic operations on access authorization parameters corresponding to the communicated access authorization parameters using at least a first key of the key pair, yields a positive result and it is determined that at least one predefined set of the communicated access authorization parameters, in view of respective pieces of reference information present in the access control apparatus at least at the time of the first checking, respectively authorize for access.

Each of these aspects of the invention further discloses in each case:

a computer program, comprising program instructions that cause a processor to perform and/or control the method in accordance with the respective aspect of the invention when the computer program runs on the processor. In this specification, a processor should be understood to mean, inter alia, control units, microprocessors, microcontrol units such as microcontrollers, digital signal processors (DSP), application-specific integrated circuits (ASICs) or Field Programmable Gate Arrays (FPGAs). Here either all the steps of the method can be controlled, or all the steps of the method can be performed, or one or more steps can be controlled and one or more steps can be performed. The computer program can be distributable for example via a network such as the Internet, a telephone or mobile radio network and/or a local network. The computer program can be at least partly software and/or firmware of a processor. It can equally be implemented at least partly as hardware. The computer program can be stored for example on a computer-readable storage medium, e.g. a magnetic, electrical, electromagnetic, optical and/or other type of storage medium. The storage medium can be for example part of the processor, for example a (nonvolatile or volatile) program memory of the processor or a part thereof An apparatus, configured to perform and/or control the method in accordance with the respective aspect of the invention or comprising respective means for performing the steps of the method in accordance with the respective aspect of the invention. Here either all of the steps of the method can be controlled, or all the steps of the method can be performed, or one or more steps can be controlled and one or more steps can be performed. One or more of the means can also be implemented and/or controlled by the same unit. By way of example, one or more of the means can be formed by one or more processors.

An apparatus comprising at least one processor and at least one memory that includes program code, wherein the memory and the program code are configured to cause the apparatus having the at least one processor to perform and/or control at least the method in accordance with the respective aspect of the invention. Here either all the steps of the method can be controlled, or all the steps of the method can be performed, or one or more steps can be controlled and one or more steps can be performed.

A fourth aspect of the invention discloses a system, comprising:
an access control apparatus in accordance with the first aspect of the invention,
an access authorization generation apparatus, in particular in accordance with the second aspect of the invention, and
an access authorization proving apparatus, in particular in accordance with the third aspect of the invention, wherein the access authorization information is generated by the access authorization generation apparatus and is communicated to the access control apparatus by the access authorization proving apparatus.

These four aspects of the present invention have inter alia the—in part exemplary—properties described below.

Access control is performed at an access control apparatus; by way of example, access to rooms of buildings (e.g. hotels, office complexes, laboratories) or apparatuses, to events (e.g. concerts, sporting events), to functions (for example of a computer, e.g. via a login), to resources or to services (for example to a service provided by a server, e.g. online banking, social networks, email accounts) is controlled. Examples of access to areas of apparatuses are access to receptacle areas of receptacle apparatuses, such as e.g. lockboxes, lockers, refrigerators, goods delivery containers, mailboxes, parcel boxes or combined mail and parcel boxes, which for example are in each case closed with doors and secured by locking devices.

The access control apparatus can be for example one or more processors that control one or more locking devices, for example an electronically controllable lock, and can thus bring about opening and/or closing of the lock, for example. The lock can be equipped with a latch function, for example, such that the access control apparatus has to control for example only an opening of the lock (for example by means of at least temporarily transferring the latch to an open position, for example by means of an electric motor), while the lock is closed manually by a user by a procedure in which said user uses the latch function and, for example, by pressing a door shut, displaces the latch from the shut position to the open position and, after the process of pressing shut has ended, the latch automatically returns to the shut position again, for example by means of spring preloading.

The access control apparatus can also comprise the locking devices and further components. The access control apparatus can be part of an apparatus for which it provides access control, for example of a receptacle apparatus. The access control apparatus can be battery-operated, for example, and have no, more particularly continuous, power connection, for example. The access control apparatus can be configured for example in such a way that in operation it is configured exclusively for communication with access authorization proving apparatuses, and for example is not configured for communication with the access authorization generation apparatus. The access control apparatus has for example no connection to a mobile radio network, a local area network (LAN), a wireless local area network (WLAN) or the Internet, that is to say that it thus constitutes for example an "offline" access control apparatus. The wireless communication of the access control apparatus can be configured for example for communication with apparatuses in relatively close proximity to the access control apparatus (for example less than 100 m). The wireless communication of the access control apparatus can be limited for example to communication by means of Radio Frequency Identification (RFID) and/or Near Field Communication (NFC) and/or Bluetooth (e.g. Bluetooth Version 2.1 and/or 4.0). RFID and NFC are specified for example in accordance with ISO standards 18000, 11784/11785 and ISO/IEC standard 14443-A and 15693. The Bluetooth specifications are available at www[dot]Bluetooth[dot]org. Nevertheless, the access control apparatus can have for example a Universal Serial Bus (USB) interface, via which the access control apparatus can be maintained, for example.

The access control can consist for example in taking a decision, on the basis of access authorization information presented, as to whether access is permitted to be granted. If it is decided that access is permitted to be granted, for example access is granted, for example by a control signal being transmitted, for example to a lock, in order for example to unlock and/or open a door to one or more areas (e.g. receptacle areas of a receptacle apparatus) in order to enable access to the one or the plurality of areas. Access can be granted to different extents; by way of example, if a plurality of receptacle areas are present, only access to specific receptacle areas or groups of receptacle areas can be granted. The extent of the access can be defined for example in an access authorization parameter of the access authorization information.

At the access control apparatus, access authorization information is obtained that was communicated to the access control apparatus, in particular from an access authorization proving apparatus on which the access authorization information is stored at least temporarily. The access authorization information can be communicated to the access control apparatus for example by means of wireless communication, for example by communication by means of RFID, NFC or Bluetooth.

The access authorization proving apparatus can be for example a portable electronic device. The device is assigned for example to a user (e.g. a user registered vis-à-vis the access control apparatus) who would like to obtain access with the access authorization information at the access control apparatus, and said device is therefore referred to hereinafter as "user device". The user device has for example a graphical user interface and/or a dedicated power supply. The user device is for example a cellular phone, a personal digital assistant (PDA), a media player (e.g. an iPod), or a navigation device. If the access control apparatus is assigned to a parcel box, the user device can belong for example to a parcel box user, that is to say for example an owner of the parcel box, or a person who, via the parcel box, is permitted to receive parcels or to insert them for storage by a deliverer. A deliverer in this sense is not understood as a user. The user device is configured for wireless communication with the access control apparatus, for example via Bluetooth and/or RFID and/or NFC. The device has the capability, for example, of communicating via a cellular mobile radio network (e.g. a mobile radio network based on the Global System for Mobile Communication (GSM), the Universal Mobile Telecommunications System (UMTS) and/or the Long Term Evolution (LTE) System).

Alternatively, the access authorization proving apparatus can be for example a portable electronic device of a deliverer, particularly if the access control apparatus is assigned to a parcel box. This device is referred to hereinafter as "deliverer device". The deliverer device has for example a graphical user interface and a functionality for wirelessly detecting information of parcels, for example by optically scanning parcel labels and/or detecting information of parcels via radio (e.g. RFID) or magnetic fields (e.g. NFC), for example if the parcel has an RFID tag or NFC tag. The deliverer device can have for example the capability of communicating via a cellular mobile radio network, but this can also not be the case. The deliverer device can have for example the capability of communicating via WLAN and/or via a cellular mobile radio system (in particular via GRPS). The deliverer device can have for example the capability of communicating via Bluetooth and/or NFC, for example also by means of corresponding retrofitting. One example of a deliverer device is a handheld scanner, e.g. LXE Tecton MX7 from Honeywell.

If the access authorization proving apparatus (in particular the user device and/or the deliverer device) communicates access authorization information to the access control apparatus by means of Bluetooth, it is advantageous for the medium access control (MAC) address of the access control apparatus to be known to the access authorization proving apparatus, since the Bluetooth communication can then be started without the need for time-consuming Bluetooth pairing. The MAC address of the access control apparatus is communicated to the access authorization proving apparatus for example together with the access authorization information.

Alternatively, the access authorization proving apparatus can be for example a portable electronic unit for wireless communication with the access control apparatus. This portable electronic unit is referred to hereinafter as "tag". The tag can have for example no capability for communication by means of cellular mobile radio and/or no capability for communication by means of WLAN and/or no capability for communication by means of Bluetooth. The tag can have for example no graphical user interface and/or no dedicated power supply. The tag can communicate for example only in the presence of an (e.g. electromagnetic or magnetic) reading field of a reader. The tag can be for example an RFID or NFC tag (e.g. an MiFARE tag from NXP). The tag can have different form factors, for example. It can be embodied for example as a key fob or as a card (e.g. approximately having the form factor of a credit card). The tag can have for example small dimensions (e.g. less than in each case 9 cm or 5 cm height/length/width) and low weight (e.g. less than 50 g). The information (e.g. the access authorization information) stored on the tag can be communicated for example to a corresponding reader, for example also only after successful authentication of the reader vis-à-vis the tag. The reader can for example be part of the access control apparatus or be operatively connected thereto. The tags can operate for example at 120-135 kHz, 13.56 MHz or 865-869 MHz, but other, in particular higher, frequencies are also possible. The information transmission can be based for example on capacitive coupling, inductive coupling or on electromagnetic waves (backscatter method). The tag can comprise for example an antenna, an analog circuit for transmitting and receiving (also referred to as a transceiver), a digital circuit (e.g. a microcontroller) and a memory (for example an EEPROM—Electrically Erasable Programmable Read-Only Memory). The access authorization information can be modulated for example onto a high-frequency signal generated by a reading unit, for example in the form of a load modulation. The reading unit can then obtain the authorization information from the tag as a result.

The access authorization information is generated on the access authorization generation apparatus, which can be embodied for example as one or more servers. It is then output for storage on an access authorization proving apparatus. This can be done, for example, by the access authorization information being transmitted via a communication connection between the access authorization generation apparatus and the access authorization proving apparatus to the access authorization proving apparatus and being stored there, particularly if the access authorization proving apparatus is a user device (e.g. a cellular phone, as described above). By way of example, on the access authorization proving apparatus there is then present a functionality, for example as an application ("app"), which can be downloaded from an online marketplace, for example, and which serves inter alia for retrieving access authorization information. The access authorization information can be transmitted from the access authorization generation apparatus to the access authorization proving apparatus for example whenever the validity of the access authorization proving apparatus has elapsed, for example on a yearly or half-yearly cycle. For this purpose, the access authorization information can be actively pushed (that is to say transmitted without enquiry by the access authorization proving apparatus) for example from the access authorization generation apparatus to the access authorization proving apparatus, or can be transmitted to the access authorization proving apparatus only upon enquiry by the access authorization proving apparatus (or some other entity) (and can for example also only be generated in response to the enquiry). The communication connection between the access authorization generation apparatus and the access authorization proving apparatus can be based on one or more communication networks, at least one of which for example is a mobile radio network or a WLAN network. If the access authorization proving apparatus is a user device (e.g. a cellular phone), for example, the access authorization information can be obtained from the access authorization generation apparatus for example via a Hypertext Transfer Protocol (HTTP)- or Hyper Text Transport Protocol Secure (HTTPS) connection based for example on a General Packet Radio (GPRS) connection.

If the access authorization proving apparatus is a deliverer device (e.g. a handheld scanner of a deliverer), for example, the access authorization information can be transmitted for example via the Internet to a computer (e.g. a computer in a delivery base with which the deliverer device is associated at least at times) and, under the control thereof, can then be transmitted to the deliverer device for example in a wired manner (e.g. by means of a docking station) or wirelessly (e.g. by WLAN). This can take place anew every day, for example.

If the access authorization proving apparatus is for example a tag (e.g. an RFID or NFC tag, as described above), the access authorization generation apparatus outputs the access authorization information to the tag for storage for example by the access authorization information being transmitted to a writing unit (for example via the Internet), which then writes the access authorization information to the tag. By way of example, the access authorization information is transmitted to a computer of a supplier or manufacturer of tags, which then performs the writing of the access authorization information to the tags. This is done for example before the tags are issued to the persons who are intended to use the access authorization information for access authorization proving (e.g. user and/or deliverer). The validity of the access authorization information stored on tags, on account of the higher outlay for replacing the access authorization information in the tags in comparison with the user devices and/or deliverer devices, can be longer than the validity of the access authorization information stored on the user devices and/or deliverer devices.

The access authorization information contains one or more access authorization parameters. This can involve for example a (more particularly unique) identifier for the access control apparatus, a (more particularly unique) identifier for the access authorization information itself, temporal validity information (e.g. in the form of a "not before date", a "not after date", a "start time of day" and an "end time of day", which specify within which days and within which time of day access is permitted to be granted, for example from 3.27.2014 00:00:00 hours to 3.28.2014 23:59:59 hours), an upper limit of the allowed uses of the access authorization information in order to obtain access, and information as to what extent access is permitted to be granted (that is to say for example whether all the doors of a parcel box are permitted to be opened, or only one door or a specific group thereof). The one or the plurality of access authorization parameters are also referred to jointly as access authorization in this specification.

At least one predefined set (e.g. all, or only some) of the access authorization parameters are checked with regard to respective reference information to determine whether they authorize for access in each case. By way of example, the identifier for the access control apparatus as access authorization parameter can be checked vis-à-vis an identifier of the access control apparatus that is stored in the access control apparatus, and in the event of correspondence it can be determined that this access authorization parameter authorizes for access. The temporal validity information as access authorization parameter can be checked for example vis-à-vis temporal information (e.g. date and time of day) obtained from a clock of the access control apparatus, for example in such a way that a time period defined by the validity information must contain the current point in time according to the clock of the access control apparatus in order that access can be granted. A predefined temporal tolerance can be permissible here in order to compensate for possible time differences between the clock of the access control apparatus and a clock in the access authorization generation apparatus. A communicated upper limit of the allowed uses can be correspondingly checked against a counter that is stored in the access control apparatus and that is incremented by 1 each time this access authorization information is used for obtaining access at the access control apparatus. The comparison of the communicated upper limit with the counter as reference information reveals that access is permitted to be granted if the counter is less than the communicated upper limit.

While for example the identifier of the access control apparatus and the temporal information obtained from the clock are continuously present in the access control apparatus, there can be one or more access authorization parameters which must be checked vis-à-vis reference information and which are not present continuously in the access control apparatus, but rather for example only in the first checking or shortly before the first checking. This may be the case for example for the identifier of the access authorization information or of the access authorization proving apparatus as access authorization parameter if this identifier, for example in encrypted form (or alternatively in combination with a fourth key), is obtained at the access control apparatus only together with the access authorization information or before or after the access authorization information (but in the same communication session, for example). Here, too, granting access necessitates that the identifier of the access authorization information that is communicated as access authorization parameter corresponds to the identifier of the access authorization information that is obtained by decryption from the identifier obtained in encrypted fashion. In a similar manner, the identifier of the access authorization information or of the access authorization proving apparatus can also be checked vis-à-vis a rejection list as an example of reference information. Said rejection list may for example not already be stored on the access control apparatus initially, but rather only after a portion of the operating duration of the access control apparatus has elapsed. The case may occur, for example, that the rejection list is obtained at the access control apparatus in the same communication session in which the access authorization information is also transmitted to the access control apparatus, for example temporally before the access authorization information.

An access authorization parameter that is not checked against reference information is, for example, the information regarding the extent to which access is intended to be granted. This information is taken into account for example when granting access, but for example not when checking whether access is intended to be granted. By way of example, the information regarding the extent to which access is intended to be granted can specify which door or which group of doors from a plurality of doors of a building or of an apparatus is intended to be opened if it was decided that access is permitted to be granted. If the apparatus is a parcel box having a door for a parcel compartment and a door for a letter compartment, the information can specify for example whether only the parcel compartment is intended to be opened (for example for a deliverer) or both the parcel compartment and the letter compartment are intended to be opened (for example for a user of the parcel box).

However, before the individual access authorization parameters are checked vis-à-vis their respective reference information in the access control apparatus, the first checking must yield a positive result. The first checking analyzes the first check information contained in the access authorization information in order to determine the integrity (intactness or freedom from manipulation) and authenticity (genuineness or origin of the supposed source) of the access authorization information, as will be explained in even greater detail below. The authenticity of the access authorization information is primarily determined by virtue of the fact that the station that issues the access authorization information, that is to say the access authorization generation apparatus, in the cryptographic operations, used the first key of a key pair kept secret between the access control apparatus and the access authorization generation apparatus, which can be checked by the access control apparatus on the basis of the second key of said key pair, the first check information and the communicated access authorization parameters. In the course of this check, the integrity of the communicated access authorization parameters is also confirmed. In this case, none of the keys of the key pair is known for example outside the access control apparatus and the access authorization generation apparatus; in particular, these keys are not known even by the access authorization proving apparatus or the users thereof. The key pair can be a symmetrical key pair, for example, which means that the first key and the second key are identical. Encryption and decryption using such symmetrical keys can be performed for example according to the methods of Advanced Encryption Standard (AES), DES (Data Encryption Standard), Data Encryption Algorithm (DEA), Triple-DES, IDEA (International Data Encryption Algorithm) or Blowfish, to give just a few examples. Symmetrical keys can be chosen pseudo-randomly, for example. In the case of an asymmetrical key pair, by contrast, both keys are different, e.g. in the case of an asymmetrical key pair according to the RSA (Rivest, Shamir, Adleman) method or according to the method according to McEliece, Rabin, Chor-Rivest or Elgamal. Methods for generating symmetrical and asymmetrical keys for generating digital signatures, message authentication codes (MACs) and for encryption and decryption are specified in the publication "Special Publication 800-133 Recommendation for Cryptographic Key Generation" by the National Institute of Standards and Technology (NIST) at the US Department of Commerce.

Access is thus granted if the first checking had a positive outcome, that is to say that in particular the integrity and authenticity of the access authorization information were confirmed, and it was also determined for at least a specific set of the access authorization parameters that these authorize for access vis-à-vis their respective reference information in the access control apparatus. If it is decided that access is permitted to be granted, for example a corresponding control signal is output, for example to a lock. Otherwise, for example an e.g. optical or acoustic alarm or a warning is output.

The access control system embodied in accordance with the first to the fourth aspects of the invention has a number of advantages. By virtue of the fact that the access control apparatus and the access authorization generation apparatus treat the key pair as a secret, firstly the access authorization generation apparatus is enabled exclusively itself to create access authorization information for the access control apparatus. The access control apparatus, secondly, can trust the access authorization information generated by the access authorization generation apparatus. Therefore, the access authorization parameters can also be communicated to the access control apparatus without encryption, in principle: using the second key of the key pair, their integrity and the authenticity of the access authorization information can be confirmed sufficiently. Since the access control apparatus uses, for checking the communicated access authorization parameters, either reference information that is invariable over the long term, such as the identifier of the access control apparatus, or self-manageable reference information such as e.g. the temporal information derived from the local clock of the access control apparatus or the counter for the granted accesses already effected with specific access authorization information, the access control apparatus is substantially autonomous and manages without a network link. This also reduces the power consumption, which is likewise pertinent in the case of a battery-operated apparatus. Further, in the access control apparatus the cryptographic operations are performed on the communicated access authorization parameters, rather than on access authorization parameters present locally. This makes it possible, in particular, to separate the check of the integrity of the obtained information from the check of the content thereof. If, for example, as an alternative, the "expected" first check information were calculated in the access control apparatus and then compared with the communicated first check information, the expected first check information would have to be formed and compared with the communicated first check information for a plurality of points in time depending on the granularity of the temporal validity used as access authorization parameter (e.g. 1 minute, 10 minutes, 1 hour), in order to "hit" the communicated check information exactly with at least one expected first check information piece. Instead, in the present access control system, the integrity of the communicated temporal validity is determined and this temporal validity is compared with the temporal information in the access control apparatus in order to determine significantly more simply and more rapidly whether the difference is still within a predefined tolerance.

Further advantages of the access control system disclosed are described below on the basis of exemplary embodiments, the disclosure of which is intended to apply equally to all four aspects of the invention and all the respective categories (method, apparatus/system, computer program).

In one exemplary embodiment of all the aspects of the invention, the key pair is an asymmetrical key pair, and the first checking comprises checking the communicated first check information as a digital signature by means of the access authorization parameters using at least the second key of the key pair and the communicated access authorization parameters. The first and second keys of the asymmetrical key pair are then different. By way of example, the first key is a private key and the second key is a public key, or vice versa. The key pair may have been generated according to the RSA algorithm, for example. The digital signature is formed (in particular in the access authorization generation apparatus) for example by a Hash value being formed by means of the access authorization parameters, for example according to an algorithm from the Secure Hash Algorithm (SHA) family, such as are specified by the National Institute of Standards and Technology (NIST), for example an SHA-1, SHA-224 or SHA-256, to give just a few examples. The Hash value is then encrypted using the first key, for example, in order to obtain the first check information. Alternatively, the access authorization parameters can also be encrypted without the formation of a Hash value. For checking the signature, the first check information is decrypted using the second key and the Hash value obtained as a result is compared with a Hash value formed locally by means of the communicated access authorization parameters according to the same algorithm. In the event of correspondence of the Hash values, the authenticity of the access authorization information and the integrity of the access authorization parameters can be assumed. If no Hash value formation takes place, the access authorization parameters obtained by decryption are compared directly with the communicated access authorization parameters.

In one exemplary embodiment of all the aspects of the invention, the key pair is a symmetrical key pair, and the first checking comprises performing the cryptographic operations on the communicated access authorization parameters using at least the second key of the key pair for obtaining locally generated first check information and comparing the communicated first check information with the locally generated first check information. The symmetrical key pair then comprises the same key twice, for example an AES key, e.g. an AES-128 key. As in the case of an asymmetrical key pair, the first check information can be generated by encryption of the access authorization parameters or of a Hash value thereof using the first key (in particular in the access authorization generation apparatus). The check is then performed by decrypting the communicated first check information using the second key (identical to the first key) and comparing the result with either the access authorization parameters or a Hash value of the access authorization parameters generated locally according to the same algorithm. In the event of correspondence, the authenticity of the access authorization information and the integrity of the access authorization parameters are assumed. In encryption/decryption it is possible to use for example a block cipher, for example with an Electronic Code Book (ECB), a Cipher Block Chaining (CBC), a Cipher Feedback (CFB), an Output Feedback or a Counter operating mode, such as are known to the person skilled in the art, in order to enable the encryption/decryption of information that is longer than the block of the block cipher. Depending on the operating mode (e.g. in the CPC or CFM operating mode) an initialization vector (IV) may be required here in addition to the keys in encryption/decryption. Said initialization vector may either be fixedly agreed (and then be stored for example in the access control apparatus) or communicated to the access control apparatus for each access authorization information piece. Instead of encrypting/decrypting the access authorization parameters or the Hash value thereof in order to obtain the first check information, it is also possible to use a message authentication code (MAC) for generating the first check information, which code is formed by means of the access authorization parameters and likewise takes account of the first key. Examples of MACs are the Message Authentication Algorithm (MAA), the Keyed-Hash Message Authentication Code (HMAC) or the Cipher-Based Message Authentication Code (CMAC) specified by the NIST. In the case of an MAC, for example in a combined process, a type of Hash value is created by means of the access authorization parameters and the first key is concomitantly taken into account here. The result forms the first check information. For checking the first check information, at the access control apparatus, by means of the communicated access authorization parameters using the second key (identical to the first key), the MAC is formed according to the identical specification and the result, the locally generated first check information, is compared with the communicated first check information. In the event of correspondence, the authenticity of the access authorization information and the integrity of the access authorization parameters are proved.

In one exemplary embodiment of all the aspects of the invention, the access control apparatus constitutes an access control apparatus from a plurality of access control apparatuses, wherein a second key of a symmetrical or asymmetrical individual key pair is stored in the access control apparatus, said second key being stored only on the access control apparatus, but on none of the other access control apparatuses of the plurality of access control apparatuses, and wherein the second key of the key pair that is used in the first checking is the second key of the individual key pair. Accordingly, therefore, the first key of the individual key pair is then also used when generating the first check information (in particular at the access authorization generation apparatus). The access authorization information generated for a specific access control apparatus is thus unique and usable only for one access control apparatus, but not for any other access control apparatuses. In the event of the loss of an access authorization proving apparatus having such stored access authorization information, therefore, misuse is only possible with one access control apparatus, and not with a plurality of access control apparatuses.

In one exemplary embodiment of all the aspects of the invention, the access control apparatus constitutes an access control apparatus from a plurality of access control apparatuses, wherein a second key of a symmetrical or asymmetrical individual key pair is stored in the access control apparatus, said second key being stored only on the access control apparatus, but on none of the other access control apparatuses of the plurality of access control apparatuses, wherein a second key of a symmetrical or asymmetrical group key pair is further stored in the access control apparatus, said second key being different than the second key of the individual key pair and being stored in all the access control apparatuses of a group of access control apparatuses from the plurality of access control apparatuses that comprises the access control apparatus, and wherein the second key of the key pair that is used in the first checking is either the second key of the individual key pair or the second key of the group key pair. Accordingly, therefore, the first key of the individual key pair or the first key of the group key pair is then also used when generating the first check information (in particular at the access authorization generation apparatus). In this case, the access authorization information generated for a specific access control apparatus using the first key of the individual key pair is unique and usable only for one access control apparatus, but not for any other access control apparatuses. In the event of the loss of an access authorization proving apparatus having such stored access authorization information, therefore, misuse is only possible with one access control apparatus, and not with a plurality of access control apparatuses. Further, however, the group key pair makes it possible to generate access authorization information that can be used for proving the authorization at a plurality of access control apparatuses. This is advantageous, for example, if service staff in a hotel are intended to obtain access to a plurality of rooms provided with respective access control apparatuses or deliverers of parcels are intended to obtain access to a plurality of parcel boxes provided with respective access control apparatuses, e.g. in a delivery area. Such access authorization information generated using a first key of the group key pair can be stored for example on a tag (e.g. an RFID or NFC tag). Since such tags may possibly have a comparatively long period of validity (e.g. several months) and if lost, could be used for improperly obtaining access at numerous access control apparatuses, it is advantageous for such tags or the access authorization information situated thereon to be provided with a unique identifier that can be locked for example by a rejection list stored in the access control apparatus, as will be explained in greater detail below.

At least one second key of a symmetrical or asymmetrical further group key pair can further be stored in the access control apparatus, said at least one second key being different than the second key of the individual key pair and the second key of the group key pair and being stored in all the access control apparatuses of a further group of access control apparatuses from the plurality of access control apparatuses that comprises the access control apparatus, said further group including, however, at least one or more other access control apparatuses in comparison with the group of access control apparatuses, and wherein the second key of the key pair that is used in the first checking is either the second key of the individual key pair, the second key of the group key pair or the second key of the further group key pair. Therefore, the access control apparatus then has for example the second keys of the individual key pair and of two group key pairs. This is particularly advantageous if the access control apparatus is logically assigned to two at least partly different groups of access control apparatuses. If the access control apparatus is assigned to a parcel box, for example, when delivery areas are defined dynamically for example it can happen that the same parcel box is assigned to a first delivery area on one day and to a second delivery area on another day. Further or alternatively, it can happen that delivery areas overlap on the same day, for example because the first delivery area is assigned to a parcel deliverer and the second delivery area is assigned to a combination deliverer (who delivers parcels and letters) or letter deliverer. In order that the parcel box can nevertheless be opened both by the deliverer for the first delivery area and the deliverer for the second delivery area, it is advantageous to store the respective second keys of second group key pairs on the access control apparatus. The access authorization information of the deliverer for the first delivery area (in particular its first check information) is then based on the first key of a first group key pair, and the access authorization information of the deliverer for the second delivery area (in particular its first check information) is then based on the first key of a second group key pair. These access authorization information pieces can then be stored for example on respective tags for the respective delivery areas (a first tag for the first delivery area and a second tag for the second delivery area).

By way of example, is it possible that provision is not made for changing the second key of the individual key pair in the access control apparatus, for erasing said second key or for exchanging it for another key, but wherein it can be provided that the second key of the group key pair can be changed or erased or exchanged for another key. The second key of the individual key pair can thus form a fixed component, in particular, which is not changed during the period of use of the access control apparatus. In particular, the second key of the individual key pair can be used also to check, with regard to authenticity and integrity, information (for example group key information or rejection information) that is different than the access authorization information and, in particular, is generated by the access authorization generation apparatus using the first key of the individual key pair, as will be explained in even greater detail below. By contrast, the second keys of the group key pairs can be changed, erased or exchanged, which is relevant, for example, if a parcel box has to be moved to a different delivery area on account of its owner moving home. The way in which this is done is explained below.

In one exemplary embodiment of all the aspects of the invention, at the access control apparatus, group key information communicated to the access control apparatus and comprising at least one second key—encrypted with the first key of the individual key pair—of a new symmetrical or asymmetrical group key pair for the same or an at least partly different group of access control apparatuses from the plurality of access control apparatuses, the communicated encrypted second key of the new group key pair is decrypted with the second key of the individual key pair, and the second key of the new group key pair obtained by the decrypting is stored in the access control apparatus, such that the second key of the key pair used in the first checking is at least either the second key of the individual key pair or the second key of the new group key pair. The group key information can in particular be generated at the access authorization generation apparatus and be communicated to the access control apparatus by means of the access authorization proving apparatus, for example in the context of the same communication session in which the access authorization information is also communicated to the access control apparatus, but temporally before the access authorization information, such that the second key of the new group key pair can already be taken into account when checking the access authorization information, if necessary. In this case, the second key of the group key pair already present can be either erased or maintained. By way of example, the group key information can contain a list of one or more encrypted second keys of respective one or more new group key pairs, which replaces all the second keys of respective group key pairs already present in the access control apparatus. The individual key pair here again serves as a basis of trust between the access control apparatus and the access authorization generation apparatus, but does not allow a check of the authenticity or integrity since the second keys of the respective one or the plurality of group key pairs are not further transmitted without encryption.

However, the encryption ensures that no one apart from the access authorization generation apparatus and the access control apparatus can read the second keys of the respective one or the plurality of new group key pairs in plain text, in particular not the access authorization proving apparatus. In the case where the individual key pair is a symmetrical key pair, for example a symmetrical AES encryption takes place in the CBC operating mode. An initialization vector for the CBC mode can be communicated for example together with the group key information, e.g. as part thereof, to the access control apparatus in order to be used there in the decryption.

In order to enable a check of the authenticity and integrity of the communicated group key information, the following can be performed, for example. Second check information communicated to the access control apparatus is obtained, and the second key of the new group key pair obtained by the decrypting is stored in the access control apparatus only under the precondition that, in the case of a check based at least on the communicated second check information, the second key of the individual key pair and the communicated group key information, it is determined that the communicated second check information was generated by cryptographic operations being performed on the group key information corresponding to the communicated group key information using at least the first key of the individual key pair. The second check information can be calculated and checked for example in a manner analogous to that as already described above on the basis of the first check information, wherein the cryptographic operations are performed on the group key information instead of the access authorization parameters. Thus, for example, digital signatures or MACs can again be used as second check information. The second check information is generated in particular at the access authorization generation apparatus, and then communicated to the access control apparatus by the access authorization proving apparatus.

The group key information can further comprise a counter (update_counter) that is incremented with each new group key pair, wherein the second key of the new group key pair that is obtained by the decrypting is stored in the access control apparatus only under the further precondition that a value of a counter (update_counter) comprised by the group key information is greater than a value of a counter provided in the access control apparatus, and wherein, in or after the storage of the second key of the new group key pair in the access control apparatus, the value of the counter in the access control apparatus is updated to the value of the counter (update_counter) comprised by the group key information. The counter comprised by the group key information is then for example a copy of a counter that is incremented in the access authorization generation apparatus upon each new generation of group key information (that is to say e.g. each time one or more second keys of respective one or more new group keys are intended to be brought to the access control apparatus).

The group key information can for example further comprise an individual identifier of the access control apparatus, and the second key of the new group key pair that is obtained by the decrypting can, for example, be stored in the access control apparatus only under the further precondition that an individual identifier of the access control apparatus that is stored in the access control apparatus corresponds to the individual identifier comprised in the group key information. The group key information is thus uniquely assigned to only one access control apparatus. Since the second check information is formed by means of the group key information, the integrity of the individual identifier in the group key information is further ensured.

The group key information can for example further comprise a group identifier associated with the new group key pair, said group identifier being common to all the access control apparatuses of the group of access control apparatuses for which the new group key pair is intended, and the group identifier obtained by the decrypting is stored for example in the access control apparatus. The storage of the group identifier obtained by the decryption can be performed for example only if the (above-described) preconditions required for the storage of the second key of the new group key pair that is obtained by the decryption are also fulfilled. The group identifier can serve as reference information for checking an identifier—communicated as access authorization parameter—of that unit access control apparatus for which the access authorization information is intended, and can facilitate the selection of the second key of the key pair that is used in the first checking, as will be explained in even greater detail below.

In one exemplary embodiment of all the aspects of the invention, one of the communicated access authorization parameters is an identifier for only one access control apparatus or a group of access control apparatuses, wherein it is determined that the identifier authorizes for access if the identifier corresponds to an individual identifier of the access control apparatus that is stored in the access control apparatus and/or a group identifier for a group of access control apparatuses to which the access control apparatus belongs. An identifier contained in the access authorization information is thus used for assigning the access authorization information to an access control apparatus, either on the basis of the individual identifier thereof or on the basis of the group identifier thereof.

In one exemplary embodiment of all the aspects of the invention, one of the communicated access authorization parameters is an identifier for only one access control apparatus or a group of access control apparatuses, wherein it is determined that the identifier authorizes for access if the identifier corresponds to an individual identifier of the access control apparatus that is stored in the access control apparatus and/or a group identifier for a group of access control apparatuses to which the access control apparatus belongs, wherein the first check information of communicated access authorization information which has an identifier for only one access control apparatus is generated by performing cryptographic operations on the access authorization parameters using at least one first key of the individual key pair, and wherein the first check information of communicated access authorization information which has an identifier for a group of access control apparatuses is generated by performing cryptographic operations on the access authorization parameters using at least one first key of the group key pair. An identifier contained in the access authorization information is thus used for assigning the access authorization information to an access control apparatus, either on the basis of the individual identifier thereof or on the basis of the group identifier thereof. A further assignment of the access authorization information takes place by means of the selection of the group key pair: if the access authorization information contains an identifier for only one access control apparatus, the first check information thereof is generated using the first key of the individual key pair (and correspondingly checked on the basis of the second key of the individual key pair in the access control apparatus). However, if the access authorization information contains an identifier for a group of access control apparatus, the first check information thereof is generated using the first key of the group key pair (and correspondingly checked on the basis of the second key of the group key pair in the access control apparatus).

By way of example, on the basis of the identifier, in particular on the basis of a predefined format of the identifier, in the access control apparatus, it is possible to identify whether the identifier is an identifier for only one access control apparatus or an identifier for a group of access control apparatuses is involved, such that either the second key of the individual key pair or the second key of the group key pair can be selected in the access control apparatus in each case appropriately for the first checking. By way of example, a predefined allocation of one or more predefined bit positions of the identifier can indicate whether an identifier for only one access control apparatus (e.g.: last bit position="0") or an identifier for a group of access control apparatuses (e.g.: last bit position="1") is involved.

In one exemplary embodiment of all the aspects of the invention, one of the communicated access authorization parameters is an identifier for the access authorization information or for an access authorization proving apparatus which communicates the access authorization information to the access control apparatus, and it is determined that the identifier authorizes for access if the identifier is not contained in a rejection list stored in the access control apparatus. This is particularly advantageous because as a result, in the case of loss of the access authorization proving apparatus with access authorization information stored thereon, it is possible to block the affected access authorization information. The rejection list on the access control apparatus can for example be updated on the access control apparatus by other access authorization proving apparatuses and then also comprise recently lost access authorization proving apparatuses/access authorization information, as will be described in even greater detail below.

One exemplary embodiment of all the aspects of the invention further provides for obtaining information that is communicated to the access control apparatus and comprises at least one fourth key which is encrypted using at least the first key of the key pair and which is usable in an authentication of the access control apparatus vis-à-vis an access authorization proving apparatus that communicates the access authorization information to the access control apparatus, or in the check of the authenticity and/or integrity of information communicated to the access control apparatus, and for decrypting the encrypted fourth key using at least the second key of the key pair in order to obtain the fourth key. In contrast to the second key of the key pair or the key pair itself, which constitutes a secret between the access authorization generation apparatus and the access control apparatus, the fourth key is assigned to the access authorization proving apparatus.

The fourth key together with a third key, for example, can form a symmetrical or asymmetrical key pair. The fourth key is made available to the access authorization proving apparatus by the access authorization generation apparatus for example in encrypted form (using the first key of the key pair) as described above for communication to the access control apparatus, and, in addition, for example the third key can be made available to the access authorization proving apparatus in unencrypted form, for example in order that the access authorization proving apparatus can thereby perform cryptographic operations associated for example with the authentication of the access control apparatus vis-à-vis the access authorization proving apparatus or the enabling of the checking of the authenticity and/or integrity of information communicated to the access control apparatus by the access control apparatus. The access control apparatus can then determine on the basis of the decrypted fourth key, the second key of the key pair and the communicated access authorization information (with the first check information contained therein), for example, that the access authorization information is intended for the access control apparatus (on the basis of the first check information and the second key of the key pair as described thoroughly above) and was communicated by an access authorization proving apparatus that is authorized (by the access authorization generation apparatus) (checked by authentication vis-à-vis the access authorization proving apparatus by means of H or by checking of the authenticity and/or integrity of information communicated to the access control apparatus by the access authorization proving apparatus by means of H). The information with the encrypted fourth key can be communicated to the access control apparatus by the access authorization proving apparatus for example in the same session in which the access authorization information is also communicated to the access control apparatus by the access authorization proving apparatus.

One exemplary embodiment of all the aspects of the invention further provides for obtaining information communicated to the access control apparatus and comprising at least one combination—encrypted using at least the first key of the key pair—of a fourth key and an identifier for the access authorization information or for an access authorization proving apparatus that communicates the access authorization information to the access control apparatus, wherein the fourth key is usable in an authentication of the access control apparatus vis-à-vis an access authorization proving apparatus that communicates the access authorization information to the access control apparatus, or in the check of the authenticity and/or integrity of information communicated to the access control apparatus, and for decrypting the encrypted combination using at least the second key of the key pair in order to obtain the fourth key and the identifier, wherein the identifier further constitutes one of the communicated access authorization parameters, and wherein it is determined that the identifier contained in the communicated access authorization information authorizes for access if the identifier contained in the communicated access authorization information corresponds to the identifier obtained by decrypting the encrypted information. The explanations containing the previous embodiment correspondingly apply to the present embodiment. In contrast to the previous embodiment, however, in the present embodiment, further the fourth key as a result of the encryption together with the identifier is linked to the identifier and thus also to the access authorization information or access authorization proving apparatus identified by the identifier. What is advantageous here, firstly, is that a possibility is provided for making available to the access control apparatus reference information for the check of the identifier—contained in the access authorization information as access authorization parameter—of the access authorization information or access authorization proving apparatus, which (in contrast to other reference information such as, for example, the identifier of the access control apparatus or the temporal information) is not present in the access control apparatus. Further, the access control apparatus can then determine, however, on the basis of the decrypted fourth key, the decrypted identifier, the second key of the key pair and the communicated access authorization information (with the identifier contained therein as access authorization parameter and the first check information), that the access authorization information is intended for the access control apparatus (on the basis of the first check information and the second key of the key pair as described thoroughly above) and was communicated by an access authorization proving apparatus that is authorized (by the access authorization generation apparatus) (checked by authentication vis-à-vis the access authorization proving apparatus by means of H or by checking of the authenticity and/or integrity of information communicated to the access control apparatus by the access authorization proving apparatus by means of H), and that the access authorization proving apparatus was authorized by the access authorization generation apparatus specifically for this access authorization information. The information with the encrypted combination of the fourth key and the identifier can be communicated to the access control apparatus by the access authorization proving apparatus for example in the same session in which the access authorization information is also communicated to the access control apparatus by the access authorization proving apparatus.

One exemplary embodiment of all the aspects of the invention further provides for obtaining information communicated to the access control apparatus and comprising at least one combination—encrypted using at least the first key of the key pair—of a fourth key and an identifier for the access authorization information or for an access authorization proving apparatus that communicates the access authorization information to the access control apparatus, wherein the fourth key is usable in an authentication of the access control apparatus vis-à-vis an access authorization proving apparatus that communicates the access authorization information to the access control apparatus, or in the check of the authenticity and/or integrity of information communicated to the access control apparatus, and for decrypting the encrypted combination using at least the second key of the key pair in order to obtain the fourth key and the identifier, wherein the identifier further constitutes one of the communicated access authorization parameters, and wherein it is determined that the identifier contained in the communicated access authorization information authorizes for access if the identifier contained in the communicated access authorization information corresponds to the identifier obtained by decrypting the encrypted information and the identifier is not contained in a rejection list stored in the access control apparatus. The explanations concerning the two previous embodiments correspondingly apply to the present embodiment. In the present embodiment, however, the identifier—contained in the encrypted combination or in the access authorization information—of the access authorization information or access authorization proving apparatus fulfils a double function: firstly, it serves to ensure that the communicated access authorization information originates from an access authorization proving apparatus authorized by the access authorization generation apparatus (determined by comparison of the identifier contained in the encrypted combination with the identifier contained in the access authorization information) and, secondly, it is used for coordination with a rejection list that is stored in the access control apparatus and that thus constitutes reference information for the check of the access authorization parameters represented by the identifier.

By way of example, the access authorization information communicated to the access control apparatus can be stored in identical form on at least two access authorization proving apparatuses, wherein this identical access authorization information stored on the at least two access authorization proving apparatuses in each case has the same identifier for the access authorization information and said access authorization information is associated in each case with the same fourth key (that is to say that, for example, the respective identifier of the access authorization information is encrypted in each case as a combination with the same fourth key using the first key of the key pair, for example in order to link the respective identifier to the fourth key). By way of example, a plurality or all of the access authorization information pieces contained on the access authorization proving apparatus that communicates the access authorization information to the access control apparatus can also be associated with said fourth key, wherein the identifiers of these access authorization information pieces that are intended in particular for different access control apparatuses differ. By way of example, all of the access authorization information pieces contained on a plurality of access authorization proving apparatuses can also be associated with said fourth key. There is then for example (at least at one point in time) only a single fourth key for the access authorization proving apparatuses and the access authorization information thereof. The identifier of the access authorization information is then for example in each case only specific to the access control apparatus for which the access authorization information is intended, but is not specific to the access authorization proving apparatus on which the access authorization information is stored.

The use of an identical fourth key for a plurality of different access authorization information pieces on a plurality of access authorization proving apparatuses and the use of identifiers that are specific only to the access control apparatuses but are not specific to the access authorization proving apparatus, particularly in the case of large numbers of access authorization proving apparatuses and access control apparatuses relative to fourth keys chosen individually per access authorization proving apparatus and identifiers of the access authorization information that are individual for each pairing of access control apparatus and access authorization proving apparatus, can allow a considerable reduction of the complexity associated with the generation and assignment of the fourth key and the access authorization information, since access authorization information has to be generated only for each access control apparatus and the number of combination of the fourth key with the identifier of the access authorization information which has to be encrypted using the first key of the key pair for a respective access control apparatus likewise corresponds only to the number of access control apparatuses. However, this simplification entails the disadvantage that any access authorization proving apparatus can then obtain access to all access control apparatus whose access authorization information it contains. Therefore, the access authorization information is linked only to a respective access control apparatus, but not to a specific access authorization proving apparatus. In other words, if for example a group of M access authorization proving apparatuses (e.g. deliverer devices) is equipped in each case with access authorization information for N different access control apparatuses (e.g. parcel boxes) (wherein the access authorization information for a specific access control apparatus is identical on each of the M access authorization proving apparatuses and only the access authorization information pieces for different access control apparatuses differ in each case), in order that each of said access authorization proving apparatuses can bring about access to each of the N access control apparatuses, in the case of loss of an access authorization proving apparatus the N access authorization information pieces stored on said access authorization proving apparatus can be locked only by the identifiers for said N access authorization information pieces being entered in respective rejection lists on all of the N access control apparatuses. In that case, however, it is also no longer possible for any of the other M-1 access authorization proving apparatuses to claim access to the N access control apparatuses. This disadvantage resulting from a simplified management possibility can be eliminated by a series of measures, as explained below.

By way of example, it can be provided that the access authorization information communicated to the access control apparatus has a limited temporal validity (which is for example 1 month, 2 weeks, 1 week, 3 days or 1 day) and/or has only a limited permissible number of access processes within its period of validity (for example fewer than 5, 4 or 3 access processes) and/or can be or is only communicated to the access control apparatus by the access authorization proving apparatus if it is determined at the access authorization proving apparatus that there is a need for the access to the access control apparatus (for example because a parcel or an piece of mail is intended to be inserted into or retrieved from a parcel box controlled by the access control apparatus).

The limitation of the temporal validity and/or of the number of the permissible number of access processes reduces the possibilities for misuse with regard to time and with regard to the number of possible misuse actions per access control apparatus. Taking account of the need for access restricts the possibilities of misuse to the access control apparatuses for which access processes are actually necessary, which is usually only a small portion of the access control apparatuses for which an access authorization proving apparatus has stored access authorization information. The need for access can be determined for example on the basis of mail data stored on the access authorization proving apparatus, e.g. a deliverer device. By way of example, the deliverer can optically scan, acquire via radio or read an identification of the mail from a parcel and input it into the deliverer device. The deliverer device can then for example determine the mail data associated with the identification in the deliverer device and, on the basis of a coordination of the address data (e.g. zip code, street and house number) of the mail and of the addressees—also stored in the deliverer device—of the parcel boxes and/or of the addresses of the users of parcel boxes, select that parcel box for which the mail is intended. By way of example, the deliverer can then communicate the access authorization information only to this parcel box. By means of these measures, for example, the blocking of identifiers for access authorization information stored on an access authorization proving apparatus that has gone astray can be completely dispensed with, under certain circumstances, and/or the length of the rejection lists maintained in the access control apparatus can thus be significantly reduced (for example they then contain only identifiers of access authorization information stored on lost tags, but not those of access authorization information stored on deliverer devices that have gone astray).

By way of example, the access authorization information communicated to the access control apparatus can be stored in identical form on at least two access authorization proving apparatuses, wherein said at least two access authorization proving apparatuses in each case have the same third key. Therefore, on the at least two access authorization proving apparatuses (or, for example, on all the access authorization proving apparatuses of a group of access authorization proving apparatuses) the same third key is used, which together with the fourth key forms a symmetrical or asymmetrical key pair. Therefore, for example, the authentication of said access authorization proving apparatuses vis-à-vis the access control apparatus takes place using the same third key. The disadvantage of potentially slightly reduced security that is associated with the use of an identical third key for a plurality of access authorization proving apparatuses (or, for example, all of a group or of the system), which enables a considerable reduction of the with the generation and distribution of the third key among the access authorization proving apparatuses (and also of the generation and use of the fourth key), can however be alleviated or eliminated by one or a plurality (e.g. all) of the measures outlined in the previous section.

The fourth key can further or alternatively also be used for the purposes described below.

By way of example, the fourth key together with a third key forms a symmetrical or asymmetrical key pair, the communicated access authorization information further comprises third check information, and at the access control apparatus further second checking is performed, using at least one challenge generated by the access control apparatus, the communicated access authorization parameters, the communicated first check information, the communicated third check information and the fourth key, whether the communicated third check information was generated by performing cryptographic operations on information corresponding to the generated challenge, the communicated access authorization parameters and the communicated first check information, using at least the third key, wherein a further necessary condition for granting the access is that the second checking yields a positive result. The challenge can be for example random information (e.g. a binary random number sequence) that is communicated to the access authorization proving apparatus by the access control apparatus. On the basis of the challenge, the access authorization parameter, the first check information and the third key, by performing cryptographic operations, the access authorization proving apparatus can generate the third check information, for example according to one of the methods that have already been described above for the generation of the first check information. If the fourth key is part of a symmetrical key pair, the cryptographic operations can generate for example an MAC as third check information, or a digital signature can be generated if the fourth key is part of an asymmetrical key pair. By means of the second checking, the access control apparatus can check in particular the authenticity and integrity of the access authorization parameters and first check information communicated by the access authorization proving apparatus, in other words that they were communicated by the access authorization proving apparatus and were not altered. In this case, the use of the challenge affords protection against replay attacks. This use of the fourth key can be applied for example if the access authorization information is communicated to the access control apparatus from a user device (e.g. a cellular phone) or a deliverer device (e.g. a handheld scanner), for example by Bluetooth transmission.

Alternatively, the fourth key can be used in authenticating vis-à-vis an access authorization proving apparatus that includes the access authorization information, using at least the fourth key, wherein the access authorization information is communicated to the access control apparatus by the access authorization proving apparatus only in the event of successful authentication. If the fourth key (and hence the third key as well) is a symmetrical key, for example, the access control apparatus and the access authorization proving apparatus can for example mutually verify that they each have the symmetrical key, for example by encryption of challenges obtained from the other party and a local countercheck. If the access authorization proving apparatus is for example a tag, for example an NFC tag from the Mifare tag from NXP, the symmetrical key can be stored in the tag and the access control apparatus can be granted access (in particular to the access authorization parameters and the first check information, which are stored for example in an "application" of the tag) only if both the tag and the access control apparatus accessing the tag have mutually verified that they have the symmetrical key (for example by means of a so-called three-pass mutual authentication).

One exemplary embodiment of all the aspects of the invention further provides for obtaining rejection information communicated to the access control apparatus and comprising at least one new rejection list with identifiers for access authorization information to be rejected or for access authorization proving apparatuses from which access authorization information is to be rejected at the access control apparatus, and fourth check information at the access control apparatus, and for storing the communicated new rejection list on the access control apparatus only under the precondition that it is determined in a check based at least on the communicated fourth check information, the second key of the key pair and the communicated rejection information, that the communicated fourth check information was generated by performing cryptographic operations on the rejection information corresponding to the communicated rejection information using at least the first key of the key pair. On the basis of the fourth check information, at the access control apparatus the authenticity and integrity of the rejection information obtained can be checked, for example on the basis of one of the methods such as have already been explained above for the first check information. The rejection information and/or the fourth check information are/is for example generated by the access authorization generation apparatus and communicated to the access control apparatus by the access authorization proving apparatus. A new rejection list can be communicated to the access control apparatus, for example, as soon as it has become known that at least one identifier of access authorization information or of an access authorization proving apparatus is to be blocked, for example on account of the loss of an access authorization proving apparatus. On the access control apparatus, as already explained above, a precondition for permitting access may be that the identifier of the access authorization information with which access is sought is not contained on the rejection list.

The rejection information can for example further comprise a counter that is incremented with each new rejection list, wherein the new rejection list is stored in the access control apparatus only under the further precondition that the value of the counter comprised by the rejection information is greater than a value of a counter provided in the access control apparatus, and wherein the value of the counter of the access control apparatus is updated to the value of the counter comprised by the rejection information in or after the storage of the new rejection list in the access control apparatus. It is thereby possible to prevent an attempt from being made to enable an old rejection list (which for example does not contain identifiers that are currently to be blocked) to be installed on the access control apparatus.

The rejection information can for example further comprise an identifier of only one access control apparatus or a group of access control apparatuses on which the new rejection list is intended to be stored, wherein the new rejection list is stored in the access control apparatus only under the further precondition that an individual identifier of the access control apparatus that is stored in the access control apparatus or a group identifier for a group of access control apparatuses that contains the access control apparatus corresponds to the identifier comprised in the rejection information. This identifier ensures that the rejection list can only be installed on a specific access control apparatus or group of access control apparatuses.

The above-described exemplary embodiments and exemplary configurations of all the aspects of the present invention should also be understood to be disclosed in all combinations with one another.

BRIEF DESCRIPTION OF THE SEVERAL VIEWS OF THE DRAWING

Further advantageous exemplary configurations of the invention can be gathered from the following detailed description of some exemplary embodiments of the present invention, in particular in conjunction with the figures. However, the figures accompanying the application are intended to serve only for the purpose of clarification, but not for extending the scope of protection of the invention. The accompanying drawings are not necessarily true to scale and are merely intended to reflect by way of example the general concept of the present invention. In particular, features contained in the figures ought not under any circumstances be deemed to be a necessary part of the present invention.

In the figures.

DETAILED DESCRIPTION OF THE INVENTION

Figure 1:
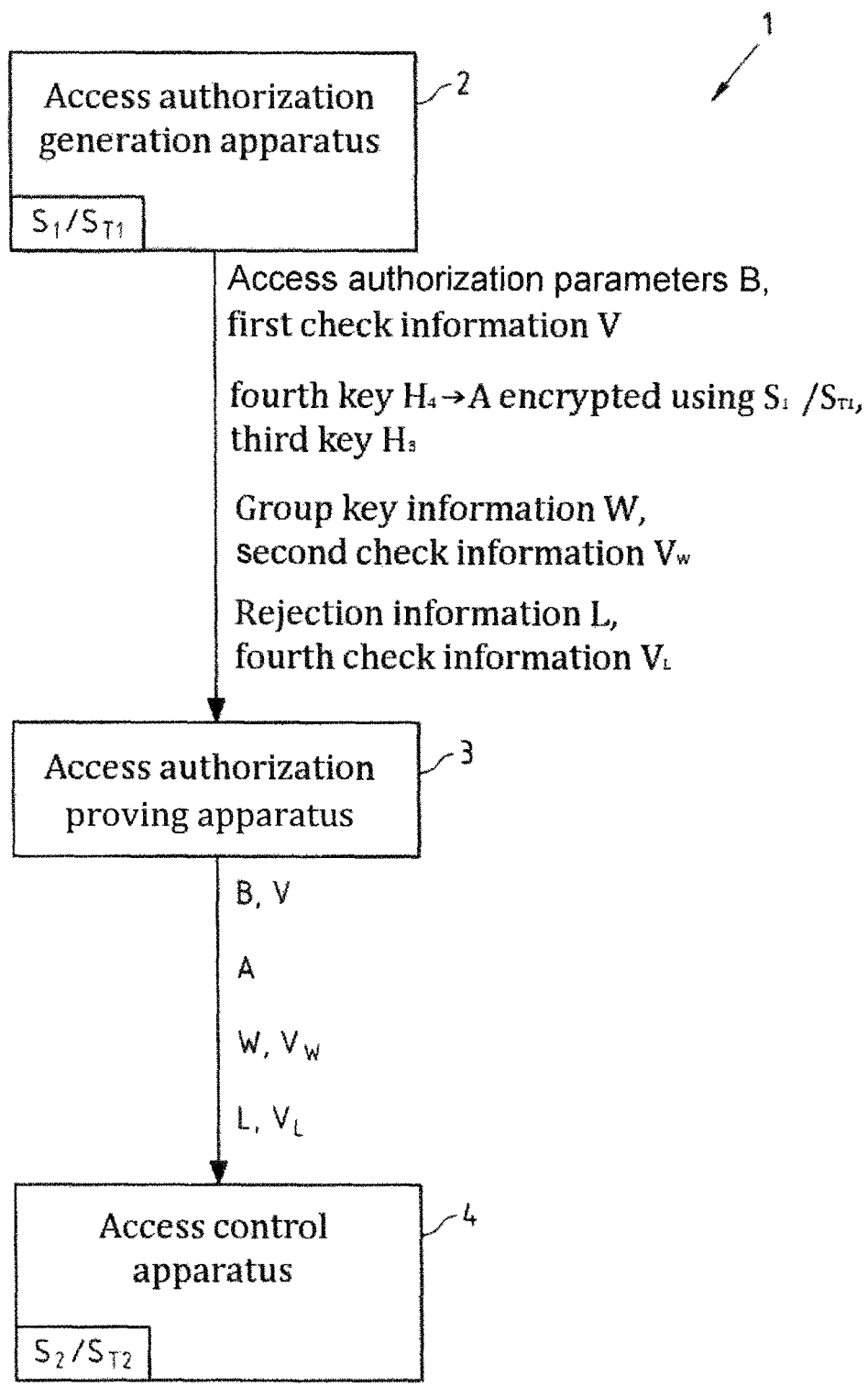
FIG. 1: shows a schematic illustration of one exemplary embodiment of a system according to the present invention.

An overview of one exemplary embodiment of a system 1 according to the invention is illustrated in FIG. 1. The system comprises an access authorization generation apparatus 2, an access authorization proving apparatus 3 and an access control apparatus 4. Particularly the access authorization proving apparatus 3 and the access control apparatus 4 can be present multiply, but are constituted only singly in each case for reasons of simplifying the illustration. The components 2, 3 and 4 constitute respective exemplary apparatuses in accordance with the first, second and third aspects of the invention, the properties of which have already been thoroughly outlined. FIG. 1 therefore serves primarily for clarification of what keys are stored in the individual components and what information is exchanged between the components. Access authorization generation apparatus 3 stores in particular the first individual key $S_1$ and optionally also a first group key $S_{T1}$, which together with a second individual key $S_2$ and a second group key $S_{T2}$, respectively, in the access control apparatus 2 respectively form an individual key pair ($S_1$, $S_2$) and a group key pair ($S_{T1}$, $S_{T2}$). These pairs can each form a symmetrical or asymmetrical key pair, wherein both keys are identical in the case of a symmetrical key pair, that is to say that e.g. $S_1=S_2=S$ and/or $S_{T1}=S_{T2}=S_T$ hold(s) true, and $S_1 \neq S_2$ and/or $S_{T1} \neq S_{T2}$ hold(s) true in the case of an asymmetrical key pair.

The access authorization proving apparatus 2 generates and transmits one or more of the following pieces of information to the access authorization proving apparatus 3:
  access authorization information B and first check information V,
  the fourth key $H_4$ encrypted with $S_1$ or $S_{T1}$, in the context of the information A,
  a third key $H_3$,
  the group key information W and the second check information $V_W$, and/or
  the rejection information L and the fourth check information $V_L$.

This information can be transmitted for example at least partly (or completely) within the same communication session between the access authorization generation apparatus 2 and the access authorization proving apparatus 3 (that is to say for example between the setting up and clearing down of a communication connection between the access authorization generation apparatus 2 and the access authorization proving apparatus 3), or else in different communication sessions. However, the group key information W can be transmitted for example less frequently than the for example the access authorization information B and the rejection information L, since the need to change them arises less often.

This information can be transmitted from the access authorization generation apparatus 2 to the access authorization proving apparatus 3 at least partly wirelessly (e.g. via mobile radio or WLAN), particularly if the access authorization proving apparatus 3 is a portable user device (e.g. a cellular phone) or a portable deliverer device (e.g. a handheld scanner). In this case, the transmission does not have to be performed directly, but rather can be performed via one or more intermediate stations (e.g. the decentralized units that will be discussed further below), as will be discussed in even greater detail below. If the access authorization proving apparatus 3 is a tag (e.g. an RFID or NFC tag), the transmission of the information should be understood as logical and can mean, for example, that the information is communicated to a server of a production system for the tags and stored there in the tags.

The third key $H_3$ and the fourth key $H_4$ here again form a key pair ($H_3$, $H_4$), which for example can be symmetrical, that is to say $H_3=H_4=H$, or can be asymmetrical, that is to say $H_3 \neq H_4$.

From the pieces of information communicated to the access authorization proving apparatus 3 by the access authorization generation apparatus 2, in principle each piece of information, apart from the third key $H_3$, can be communicated further to the access control apparatus 4 by the access authorization proving apparatus 3 and can then be used in the access control apparatus 4 for checking whether this information is authentic and has integrity and whether— in the case of the access authorization information—the operator of the access authorization proving apparatus 3 is permitted to be granted access.

In this case, the third key $H_3$ is stored in the access authorization proving apparatus 3 and used for example in the context of the mutual authentication between access authorization proving apparatus 3 and access control apparatus 4, wherein the latter has received the counterpart to the third key $H_3$, namely the fourth key $H_4$, communicated in encrypted form (information A) and, after decryption, stores it at least temporarily.

Figure 2:
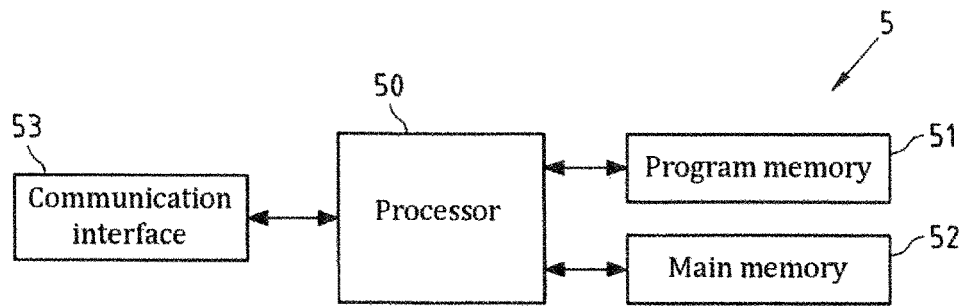
FIG. 2: shows a schematic illustration of one exemplary embodiment of an apparatus according to the present invention.

FIG. 2 shows a schematic illustration of one exemplary embodiment of an apparatus 5 according to the present invention. Apparatus 5 can represent for example the access authorization generation apparatus 2, the access authorization proving apparatus 3 or the access control apparatus 4 from FIG. 1.

Apparatus 5 comprises a processor 50 with assigned main memory 52 and program memory 51. The processor executes for example program instructions stored in the program memory 51. The program instructions perform the method in accordance with the first, second or third aspect of the invention and/or control it. Thus, the program memory 51 contains a computer program according to the first, second or third aspect of the invention and constitutes a computer program product for storing it.

The program memory 51 can be for example a persistent memory, such as a read-only memory (ROM), for example. The program memory can for example be fixedly connected to the processor 50, but can alternatively also be releasably connected to the processor 50, for example as a memory card, floppy disk or optical data carrier medium (e.g. a CD or DVD). Further information can also be stored in the program memory 51, or in a separate memory. If apparatus 5 is the access authorization generation apparatus 2, this information can include for example the keys $S_1$ and/or $S_{T1}$ and/or the keys $H_3$ and/or $H_4$, as well as, for example, information about the access control apparatus for which access authorization information is intended to be generated (e.g. the identifier of the access control apparatus) and information concerning the access authorization information, the group key information and/or the rejection information and the assigned check information thereof. If apparatus 5 is the access authorization proving apparatus 3, said information can include for example the information obtained from the access authorization generation apparatus 2 (in particular B, V, W, $V_W$, L, $V_L$, A, $H_3$). If apparatus 5 is the access control apparatus 4, said information can include the keys $S_2$ and/or $S_{T2}$ and also reference information on the basis of which obtained access authorization parameters are checked to determine whether they provide authorization in each case for granting access (e.g. an identifier of the access control apparatus, a rejection list, one or more counters e.g. for group key information or rejection information, etc.).

The main memory 52 is used for example for storing temporary results during the processing of the program instructions; this is for example a volatile memory, such as a random access memory (RAM), for example.

The processor 50 is further operatively connected to a communication unit 53, which enables information to be exchanged with external apparatuses, for example.

If the apparatus 5 represent the access authorization generation apparatus 2, the communication unit 53 can be configured for example for communication via a network such as the Internet, for example, in order to be able to transmit information for example to one or more the following units:

to a server of a manufacturer of access control apparatuses 4 (cf. server 72 in FIG. 9) and/or to a server of a manufacturer of access authorization proving apparatuses 3 (cf. server 73 in FIG. 9), and/or to an interface server of a mobile communication network via which information is intended to be transmitted wirelessly to an access authorization proving apparatus 3 (e.g. a cellular phone or a handheld scanner), and/or to a management server (e.g. provision server 66 in FIG. 3), under the control of which the distribution of the information to decentralized units (see 71-2 in FIG. 8) for transmission to access authorization proving apparatuses 3 (e.g. deliverer devices) takes place, and/or at least indirectly to a computer (e.g. a decentralized unit 71-2 in FIG. 8), by which or under the control of which the information is then intended to be communicated to access authorization proving apparatuses 3 (e.g. deliverer devices) (for example wirelessly (e.g. via a LAN) or in a wired manner (e.g. via a WLAN)).

If the apparatus 5 represents the access authorization proving apparatus 3 in the form of a user device or deliverer device, the communication unit 53 can comprise the following, for example:

a mobile radio interface for receiving information from the access authorization generation apparatus 2, an interface for wireless (e.g. by WLAN) or wired reception (e.g. via a docking station) of information of an apparatus (for example a decentralized unit) to which the access authorization generation apparatus 2 transmitted this information for transmission to the access authorization proving apparatus 3, a radio interface for communication with the access control apparatus 2, in particular a Bluetooth interface and/or an RFID interface and/or NFC interface.

If the apparatus 5 represents the access authorization proving apparatus 3 in the form of a tag, the communication unit 53 can comprise the following, for example:

a radio interface for communication with the access control apparatus 2, in particular a Bluetooth interface and/or an RFID interface and/or an NFC interface.

The apparatus 5 can also contain further components, for example a graphical user interface, in order to permit an operator to interact with the apparatus 5, particularly if apparatus 5 constitutes an access authorization proving apparatus 3 in the form of a user device or deliverer device. If apparatus 5 constitutes a deliverer device, the apparatus 5 can comprise for example a unit for in particular optically detecting information (e.g. a scanner), and/or for example a user interface for detecting handwritten inputs, such as e.g. a signature.

If apparatus 5 represents an access control apparatus 4, a for example optical and/or acoustic user interface can likewise be provided, in order to be able to output to the operator for example information about the status of the access control apparatus 4 and/or about the success of an attempt to be granted access at the access control apparatus 4 with access authorization information. In the case of an access control apparatus 4, the apparatus 5 can also comprise control means for controlling a locking unit (e.g. for unlocking same) depending on the decision whether access can be granted. The locking unit can comprise for example an in particular electronically controllable lock. In the context of the description of the exemplary embodiments in FIGS. 3-10, a unit comprising at least the processor 50, the memories 51 and 52 and the locking unit is referred to as "lock". In the case of an access control apparatus 4, the apparatus 5 can further also comprise one or more sensors, for example for detecting a current locking state of the locking unit. In the case of an access control apparatus 4, the apparatus 5 can comprise for example a battery (whether or not e.g. rechargeable), in particular as sole power supply. In the case of an access control apparatus 4, the apparatus 5 can have for example no connection to a wired network, that is to say in particular no connection to a LAN, and/or for example no connection to a WLAN or a mobile radio network (in particular a cellular mobile radio network).

In the case of an access authorization proving apparatus 3 in the form of a tag, the apparatus 5 can comprise for example no dedicated power supply and draw its energy for communication from the field of a reading unit of the access control apparatus 4. In the case of such a tag, it is also possible for no user interface to be present.

The components 50-53 can be embodied for example jointly as a module or unit, or can be embodied at least partly as individual modules, in order to ensure easy exchangeability in the event of possible defects.

Figure 3:
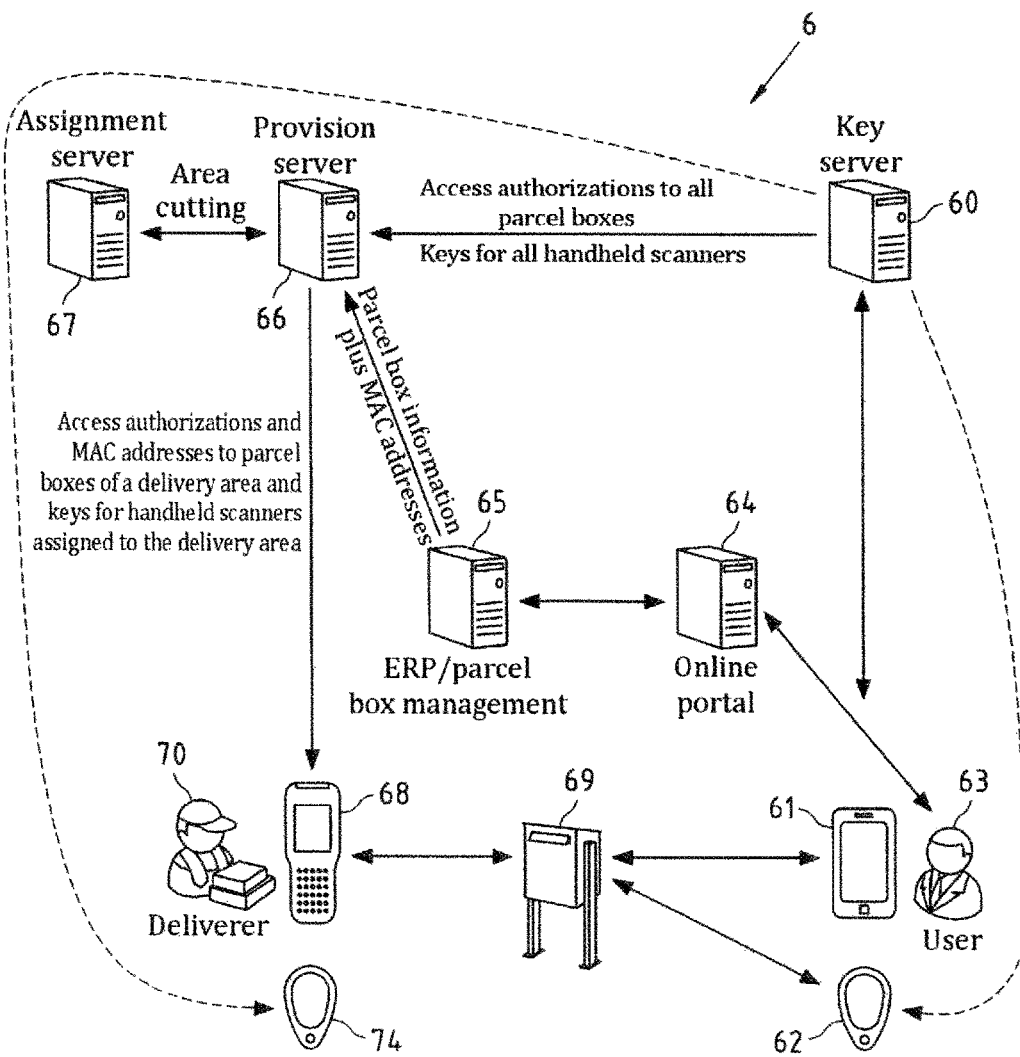
FIG. 3: shows a schematic illustration of a further exemplary embodiment of a system according to the present invention.

A concretized exemplary embodiment of an access control system 6 according to the invention, which is illustrated in FIG. 3, is presented below with reference to FIGS. 3-10. In the case of this access control system 6, the access authorization generation apparatus 2 is embodied as a key server 60, the access control apparatuses 4 are embodied as parcel boxes 69 (or units thereof that control access, in particular "locks") that are assigned to users 63 (e.g. users registered for use of the parcel boxes), and the access authorization proving apparatuses 3 are embodied as handheld scanners 68 or tags 74 of deliverers 70 or as cellular phones 61 or tags 62 of users 63, which are referred to overall as "token". The users 63 here are for example the owners of parcel boxes or other persons (e.g. from the same household or the neighborhood) who have registered themselves to receive mail in a specific parcel box 69 or to be able to have said mail collected from said parcel box. The users 63 are also referred to as parcel box users. The deliverers 70 can be for example parcel deliverers, combination deliverers (who deliver both letters and parcels) or letter deliverers. For the parcel deliverers and combination deliverers it is important, for example, to be able to open the parcel box in order to deliver parcels therein or to be able to retrieve parcels therefrom. For combination deliverers and letter deliverers it is important, for example, to be able to open the parcel box in order that large-format letters (e.g. maxi-letters) which, under certain circumstances, do not fit through a letter slot of the parcel box can be delivered into the parcel box by the latter being opened.

However, the concretization of the components 2, 3 and 4 that is effected in FIGS. 3-10 and the associated description serves only for explanation purposes and ought not to be understood as essential or restrictive. In particular, the interaction of the thus concretized components 2, 3 and 4 also in general form—that is to say detached from the concrete embodiment of these components—should be understood as disclosed. This likewise applies to the transmission techniques concretized for explanation purposes, in particular Bluetooth and NFC, which should be understood merely as an example of one possible form of the wireless communication between access authorization proving apparatuses 3 and access control apparatuses 4. A parcel box 69 is a container having at least one lockable door which is configured at least to receive parcels, for example at least one parcel having the dimensions 45×35×20 cm (which corresponds to a so-called "Packset L"), or at least two or three of such parcels. The parcel box 69 can also have a letter compartment (but alternatively can also have no letter compartment), into which letters can be inserted for example through a letter slot with or without a covering flap. The letter compartment can be lockable with its own door (with a mechanical or electronic lock) or can alternatively be locked by means of a door of the parcel box 69 together with a parcel compartment provided for receiving the parcels. If a door for the parcel compartment and a door for the letter compartment are respectively provided, for example a common access control apparatus can be provided, which either opens one door (e.g. the door of the parcel compartment, e.g. for the deliverer 70) or opens both doors (e.g. for the user 63), depending on the access authorization. The parcel box 69 can be provided for mounting in or on a wall, for example a house wall, or as a free-standing unit for fixing to the ground, e.g. in front of a house. The user 63 is notified of newly delivered mail (parcels and/or letters) for example via email and/or SMS. It is also possible for the user 63 to insert franked mail into the parcel box 69 and to request collection online or over the telephone. If no collection is ordered, the mail is collected, under certain circumstances, with somewhat of a delay when a deliverer opens the parcel box the next time and finds the mail there. As evidence of collected mail, a receipt is left in the parcel box by the deliverer, for example.

The key server 60 is operated for example in a suitable computer center of a delivery company, in particular of Deutsche Post DHL. It generates keys and access authorizations and communicates them in particular to the provision server 66. As will be described in even greater detail below with reference to FIG. 8, the provision server, from the access authorizations (and also keys, if appropriate) obtained from the key server 66, makes a selection of access authorizations required for respective delivery areas, augments this information with address information of parcel boxes and/or the users thereof (and also, if appropriate, the MAC addresses of the locks of the parcel boxes 69, with the aid of which the handheld scanners 68 can initiate a Bluetooth connection, without time-consuming Bluetooth pairing being necessary) obtained from the parcel box management system 65, and makes this information available to the handheld scanners 68 directly or indirectly. In this case, the selection is based on so-called area cutting, that is to say the assignment of mail to be delivered or collected to delivery areas for which the deliverers 70 can register with their handheld scanners 68, this area cutting being performed by the assignment server 67, which has access to the mail data.

In parallel the parcel recipients 63 obtain their keys and access authorization information which they can use to open the parcel boxes 69. The purchase of a parcel box 69 by a user 63 and/or the registration for a parcel box 69 are/is performed for example via an online portal 64 (e.g. the domain www[dot]Paket[dot]de) that exchanges information in this regard with the server of the parcel box management 65. In addition or as an alternative to the handheld scanners 70 of the deliverers, tags 74 are also provided, which can be used by the deliverers 70 (in particular letter deliverers) to open in each case a plurality of parcel boxes 69, for example all the parcel boxes 69 of a delivery area. Said tags are also referred to hereinafter as Group Lock Access (GLA) token. In a similar manner, tags 62 are also provided for the users 63 in addition or as an alternative to the cellular phones 61, which tags, however, generally only open the parcel box 69 respectively assigned to a user 62, said tags also being referred to hereinafter as Individual Lock Access (ILA) token. The access authorization information and keys contained on the tags 62, 74 are likewise generated by the key server 60 and then stored on the tags, as is indicated by the dashed lines in FIG. 3.

If the user 63 uses a cellular phone for opening the parcel box 69, said cellular phone can communicate with the key server 60 for example via a software application (referred to hereinafter as "app"). The app itself and/or its communication with the key server 60 can be configured particularly securely here, for example by measures such as encrypted communication, version control, hardening, password protection, etc.

Firstly, the components of the access control system 6 in FIG. 3 are described in greater detail below.

Locks

Locks are integrated in the parcel boxes 69 used by delivery companies to deliver both parcels and letters to customers 63. Since letters and parcels ought to be delivered exclusively to the original recipient 63, the parcel boxes 69 are responsible for the actual access authorizations. Accordingly, the parcel boxes 69 are equipped with (more particularly electronically controllable) locks and a communication interface. Further, they include the logic for obtaining access authorizations and proving and ensuring the access, that is to say the opening. Parcel boxes 69 are either owned by individual customers 63 or shared by different customers 63.

Access Authorizations

Deliverers 70 or users 63 are granted access to parcel boxes 69 only if they are in possession of a valid access authorization. Access authorizations comprise one or more of the access authorization parameters already described. In this case, access authorizations are reproduced in electronic form and written on a physical token. An access authorization can be limited both with regard to a period of use (not before and not later) and with regard to the number of their uses—for opening a lock.

Physical Tokens

A physical token includes the access authorization. There are three different types here: handheld scanners 68, NFC tags 62, 74 and cellular phones 61, for example smartphones 61. In this case, handheld scanners 68 are used for example exclusively by deliverers 70 for delivery and collection of mail (e.g. parcels). Cellular phones 61 are typically used by the customers 63. NFC tags 62, 74 can be used both by deliverers 70 and by users 63. While delivery personnel 70 who deliver letters that do not fit in the letter slot of the parcel box 69 need access to a group of parcel boxes 69, users 63 and parcel deliverers 70 with handheld scanners 68 require individual access to parcel boxes 69. Therefore, Group Lock Access (GLA) tokens (for group access) and Individual Lock Access (ILA) tokens (for individual access) are differentiated and used in the system in FIG. 3. Therefore, ILA tokens are used on the cellular phone 62 of a user 63, the NFC tag 62 of a user 63 and the handheld scanner 68 of a (parcel) deliverer 70, while GLA tokens are used on the NFC tags 74 of a (letter) deliverer 70.

Key Server

The key server 60 manages all the access authorizations of the system 6. In particular it contains information about all the users 63, all the parcel boxes 69 and the associated access rights. Therefore, it also generates the actual access authorizations that can be used on the physical tokens.

Cryptographic Keys of the Locks

Each lock of a parcel box 69 has two keys used for differentiating between the types of tokens discussed above.

For ILA tokens: A lock has an individual key $S_2$. In order to open a lock, an ILA requires a valid access authorization B. The key $S_2$ is used to verify the access authorization B. Further, the key $S_2$ is used to validate a rejection list and/or group key information. The key $S_2$ together with a key $S_1$ forms a key pair, which can be symmetrical or asymmetrical. In the case of a symmetrical key $S_1=S_2$, for example AES-128 is used as symmetrical cryptographic primitives and is used for the encryption of, for example, the so-called Cipher Block Chaining (CBC) mode together with a random initialization vector (IV). The IV can be generated individually by a random number generator (RNG) for example for each encryption and be transmitted for example as plain text. In the case of an asymmetrical key pair, for example, a digital signature is provided for checking integrity.

For GLA tokens: A lock has a group key $S_{T2}$. In order to open the lock, a GLA token requires a valid access authorization B. In this case, the key $S_{T2}$ is in turn used to verify the access authorization B. The key $S_{T2}$ together with a key $S_{T1}$ forms a key pair, which can be symmetrical or asymmetrical.

The keys $S_2$ and $S_{T2}$ are generated in the process for producing the lock, for example, and are stored in the lock. Both keys must be adequately protected in the lock against unauthorized accesses. Both keys, together with management data of the lock and a unique identifier (LockID), are communicated to the key server 60 and stored there. The key server 60 then uses the keys $S_1$ and $S_{T1}$ for cryptographic protection of the access authorizations—in order to allow the verification of the validity of the access authorizations at the lock—and the key $S_1$ further for protection of the rejection list and the group key information.

Cryptographic Keys for ILA Tokens

Each ILA token is equipped with a third key $H_3$, which together with a fourth key $H_4$ forms a symmetrical (that is to say $H_3=H_4$) or asymmetrical (that is to say $H_3 \neq H_4$) key pair ($H_3$, $H_4$). Said key $H_3$ is used for authentication of the ILA token at the lock to which the key $H_4$ is made available at least temporarily. In this case, the key server uses the key pair ($H_3$, $H_4$) in order to ensure access authorization to the lock by the ILA token. During the initialization of the ILA token, in the process the key $H_3$ is installed and stored on the key server.

The key $H_3$ can further be issued for a group of ILA tokens. In this case, all the ILA tokens of a group are then equipped with the same key $H_3$. A plurality of keys can exist in parallel on an ILA token, that is to say that one or more group keys can be present alongside one or more individual keys on an ILA token. (Even though mention is made here of groups of tokens, these should nevertheless be regarded as individual access authorizations that allow access to individual locks rather than to groups of locks.)

A group key can be installed on the device during or after the initialization process, but the key must exist on the device at all events prior to use.

Cryptographic Keys for GLA Tokens

Each GLA token is equipped with a key $H_3$ which, together with a key $H_4$, forms a symmetrical or asymmetrical key pair ($H_3$, $H_4$). The key $H_3$ is used to obtain access to a group of locks that have the key $H_4$ at least temporarily. The key server uses the key pair ($H_3$, $H_4$) to allocate access authorizations for a group of locks to the GLA token.

The key $H_3$ is installed on the device during the initialization process and is stored on the key server.

Structure of the Access Authorizations

Access authorizations are granted by the key server. An access authorization can contain one or more of the following access authorization parameters:

KeyID: ID of the access authorization (allocated by the key server)

LockID: ID of the lock
  For ILA tokens: The lock number and MAC address are communicated to the key server by the task management. Part of the LockID can be used for example to differentiate or to identify different lock manufacturers.
  For GLA tokens: In this case, the LockID is the ID of the group to which the parcel box with the concrete key belongs.

NotBeforeDate: Date "valid from" with year/month/day

NotAfterDate: Date "valid until" with year/month/day

StartTimeOfDate: Time of day starting from when the access authorization is valid (standard e.g. 00:00:00)

EndTimeOfDay: Time of day until when the access authorization is valid (standard e.g. 23:59:59)

MaxUses: Number of uses; standard 0 means "unlimited"

Permissions: Setting permission for safety-critical operations, e.g. whether it is permitted to open the parcel compartment and/or to open the parcel compartment and the letter compartment.

An access authorization can be identified by a unique KeyID. The "LockID" describes the lock (or the group of locks) for which the access authorization is valid. In this case, for example, a predefined number of bit positions of the LockID (e.g. four bits) can carry a coding that indicates whether an individual identifier or a group identifier is involved. With such a code, the lock can recognize which key it is supposed to use for the decryption: the individual key $S_2$ or one of group keys $S_{T2}$. The manufacturer from which the lock originates can also be coded in this code, or in other bit positions of the LockID.

It may happen that a lock must include a plurality of group keys if the parcel box is situated in a zone that constitutes an overlap of two delivery groups. This will be explained in even further detail below.

The two parameters "NotBeforeDate" and "NotAfterDate" define the period of validity of the access authorization, with the accuracy of one day. "NotBeforeDate" defines the date of the first use and "NotAfterDate" defines the last date in the period of validity. Further, "StartTimeOfDay" specifies the time of day from when the period of validity begins, and "EndTimeOfDay" specifies when said period of validity ends. The accuracy is one second, for example. However, other possibilities for the definition of validity intervals are also conceivable, for example in the form of a printer or index that refers to individual entries of a plurality of predefined periods of validity which for example are stored in each case in the key server and in the lock or can be calculated from the index according to a predefined rule. By way of example, in the case of access authorizations that are valid for a respective date, just the date of validity can be used as access authorization parameter, said date being specified for example as an offset with regard to a predefined reference date (e.g. 1.1.2014), that is to say for example as "20" if the access authorization is intended to be valid on 1.21.2014. "MaxUses" defines how often the key can be used to open a lock. In this case, the value "0" stipulates for example that the key is permitted to be used without limitation in the period of time. "Permissions" codes, for example by the setting of individual bits in a bit string, what security-critical operations a token is permitted to perform, as has already been enumerated above by way of example (a bit set to 1 then indicates for example in each case the presence of the authorization).

The key server grants an access authorization B for a lock. Depending on the type of token, the server generates the value V, as the result of cryptographic operations on the access authorization B using the key $S_1$ or the key $S_2$. The cryptographic operations can designate for example the formation of an MAC value by means of B with a symmetrical key $S_1$ or the formation of a digital signature by means of B using an asymmetrical key $S_1$, to give just a couple of non-restrictive examples.

Structure of the Rejection List

KeyIDs can be locked for a lock by rejection lists from the key server 60. In this case, the list contains all KeyIDs of the access authorizations which were revoked for an associated period of time of the access authorizations by the lock. Access authorizations that are no longer valid on account of their period of validity are removed from the list, for example, in order to keep said list short and thus to ensure a low storage requirement in the locks. It is for example not possible to reverse a revocation of an access authorization once said revocation has been initiated. If an access authorization has been revoked, it is no longer possible to open the lock using this access authorization.

The key server 60 generates the rejection information L (which contains the rejection list) and check information VL, which for example is again based on cryptographic operations on L using the key S1.

The rejection information L can contain for example the identifier (e.g. LockID) of the lock to which the rejection list relates, and a list of the KeyIDs to be locked. Further, a unique counter for the rejection list can be included, which indicates the ordinal number of the present rejection list for the lock. A corresponding counter can then be implemented in the lock in order to be able to check the validity of the current rejection information.

Lock Opening Using a Handheld Scanner or a Cellular Phone

A lock is opened after a token has authenticated itself by communicating a valid access authorization. This process is illustrated in the flow diagram 400 in FIG. 4.

The token (handheld scanner 68 or cellular phone 61) has received for example the following data from the key server: an access authorization B and first check information V, a third key H3 and an authentication value A, which comprises a combination—encrypted using S1—of at least H4 and the KeyID of the access authorization B. In the case of a symmetrical encryption, the initialization vector IV of a CBC mode of the encryption may likewise have been received.

The process 400 of opening a lock then proceeds as illustrated as follows (cf. FIG. 4).

In a step 401, firstly a Bluetooth connection between token 61, 68 and lock (of the parcel box 69) is set up, preferably using the MAC address of the lock that is known to the token 61, 68, in order to avoid Bluetooth pairing.

In a step 402, the token 61, 68 authenticates itself vis-à-vis the lock on the basis of the key H3. For this purpose, at least the information A is communicated to the lock, from which information the lock can obtain the key H4 using its key S2. On the basis of H3 and H4, the token 61, 68 and the lock can then perform an authentication protocol known to the person skilled in the art, for example a challenge-response method, in which the token 61, 68 applies the key H3 to a challenge (and possibly further information) received from the lock and transmits that as a response to the lock, which can then in turn check the response on the basis of the key H4 in order to determine the authenticity of the token 61, 68.

After authentication of the token 61, 68 has been performed, or in a process combined with said authentication, the token 61, 68 further communicates the information B and V to the lock.

In a step 403, the lock can then check the authenticity and integrity of B and V vis-à-vis the key server 60, that is to say determine whether B and V originate from the key server and have not been altered. The lock uses the key $S_2$ for this purpose. In the case of a successful check, the access authorization parameters of B are checked against reference information present in the lock, in order to determine whether the lock can be opened on the basis of B.

In particular, in this case—depending on the presence of the respective access authorization parameters in the access authorization information—the following can be checked, wherein the order of the checks can be arbitrary and they can already be terminated in the event of a condition not being met, or the process can jump to step 404, in order to save time and/or power:

Whether the KeyID (decrypted from A) corresponds to the KeyID of the access authorization.

Whether the access authorization is still valid from a temporal standpoint (by comparison with a clock of the lock), Whether the access authorization is not in the rejection list for the lock.

Whether the LockID of the access authorization matches the LockID of the lock.

What extent of access is permitted by the "Permissions".

MaxUses is coordinated against the internal counter of the lock and the counter is correspondingly incremented.

In step 404, a feedback indication is then signaled to the token 61, 68 (e.g. OK, ERROR, WARNING), and, given a positive result of all the checks performed, preparations are made for the lock opening.

The key $H_3$ was issued to the token 61, 68 for example during an initialization phase (particularly in the case of the token 61, for example an initialization of an app on the cellular phone 61) or was transferred as group key $H_3$ (particularly in the case of the token 68). The corresponding or identical key $H_4$ is communicated to the lock in encrypted form. As a result, the lock need not store all keys $H_4$ of all devices and can be used extremely flexibly and offline. Further, the KeyID of the access authorization is encrypted together with the key $H_4$. The key of the token is thus linked to the current access authorization of the lock. The challenge-response method is used in order to protect the protocol against so-called "replay attacks".

Lock Opening Using an NFC Tag

A lock is opened after a token 62, 74 has authenticated itself vis-à-vis the lock (of a parcel box 69) by communicating a valid access authorization.

Figure 5:
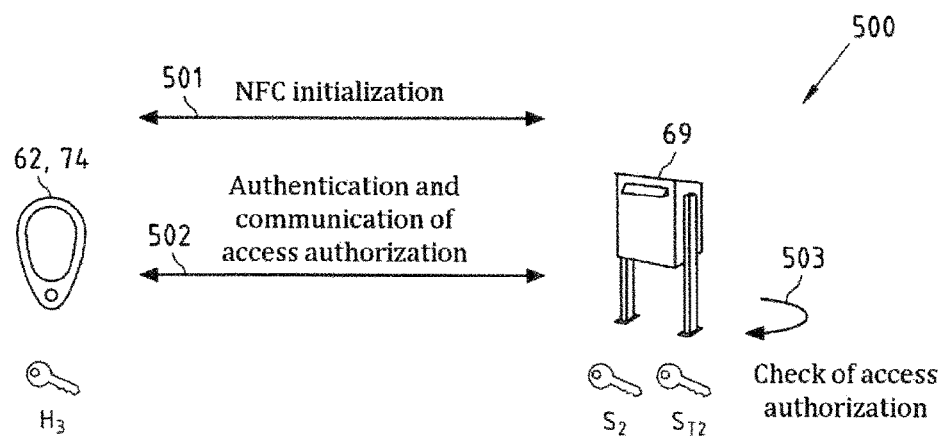
FIG. 5: shows a flow diagram of one exemplary embodiment of a communication of access authorization information between a tag and a parcel box according to the present invention.
Figure 6:
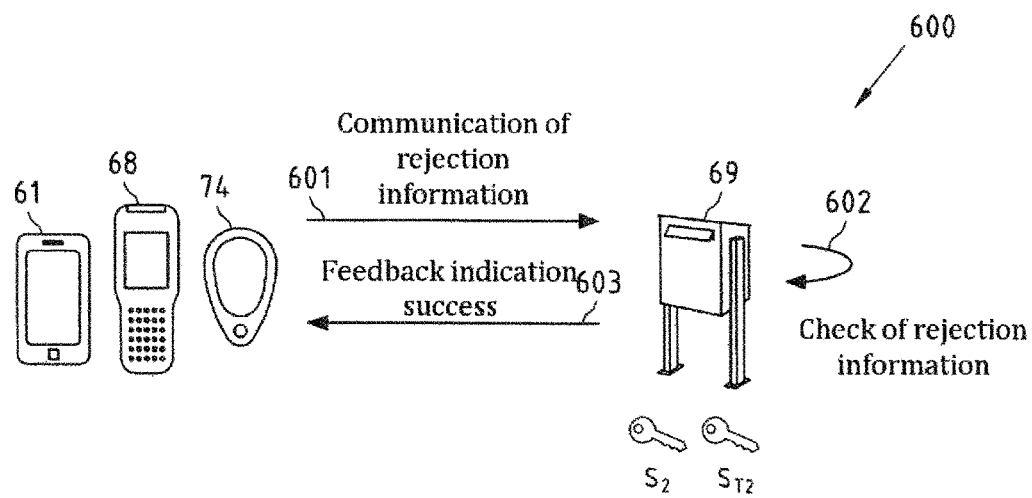
FIG. 6: shows a flow diagram of one exemplary embodiment of a communication of rejection information between a handheld scanner/cellular phone/tag and a parcel box according to the present invention.

This process is illustrated in the flow diagram 500 in FIG. 5.

The token 62, 74 has for example once again received the information B, V, A and H3, and if appropriate IV, and stores this information, wherein, in the case of an ILA token, V is based on cryptographic operations on at least B with the key S1 and, in the case of a GLA token, V is based on cryptographic operations on at least B with the key ST1. In a similar manner, in the case of an ILA token, A is based on an encryption of the combination of at least H4 and the KeyID of B with S1 and, in the case of a GLA token, A is based on an encryption of a combination of at least H4 and the KeyID of B with ST1. In the case of ILA tokens and GLA tokens, the key H3 (and its partner H4) can be chosen differently for example for each token. In contrast to the tokens 61, 68, in the case of the tokens 62, 74, the information B, V, A and H3 possibly has greater longevity since the outlay for writing this information is costly and is preferably implemented only once, in particular during the production of the tags 62, 74 or in the context of delivery or start-up.

Depending on the architecture of the token 62, 74, the third key H3 (which can also be referred to as device key) can be stored in a memory of the token, said memory not being accessible externally, and can be accessible only internally, for example for a processor of the token 62, 74, while the authentication information A is stored for example in a memory area that can be read by a reader (e.g. an NFC reader in particular of the lock). B and V can be contained in a memory area that is enabled for reading for example only if a mutual authentication has taken place between the reader/lock and the token 62, 74.

The process 500 of opening a lock then proceeds as illustrated in FIG. 5. In a step 501, an initialization of the NFC communication between token 62, 74 and lock takes place.

In step 502, a mutual authentication takes place between token 62, 74 and lock on the basis of the keys H3 and H4. For this purpose, the lock for example firstly reads out the information A from the token 62, 74 and obtains the key H4 therefrom by decryption using the key S2 or the key ST2. Which key S2 or ST2 has to be used by the lock can be identified by the lock for example on the basis of the LockID, which for example is likewise read out from the token 62, 74 (for example as part of A or separately therefrom, for example on the basis of predefined bit positions indicating whether an ILA token (->use of S2 necessary) or a GLA token (->use of ST2 necessary) is involved. Insofar as necessary depending on the type of encryption, an initialization vector IV can also be read out from the token 62, 74, for example as part of A or separately therefrom. On the basis of H3 (token) and H4 (lock), an authentication protocol is then performed, for example the DESFire authentication protocol or any other authentication protocol, which can be based for example on a challenge-response method. It may also suffice here, for example, for the lock to authenticate itself vis-à-vis the token 62, 74, for example to convert a challenge supplied by the token into a response using its key H4, said response being counter-checked in the token on the basis of H3.

In the case of successful authentication, the token 62, 74 can enable the lock (or the reader thereof) for example to read out the information B and V.

Figure 4:
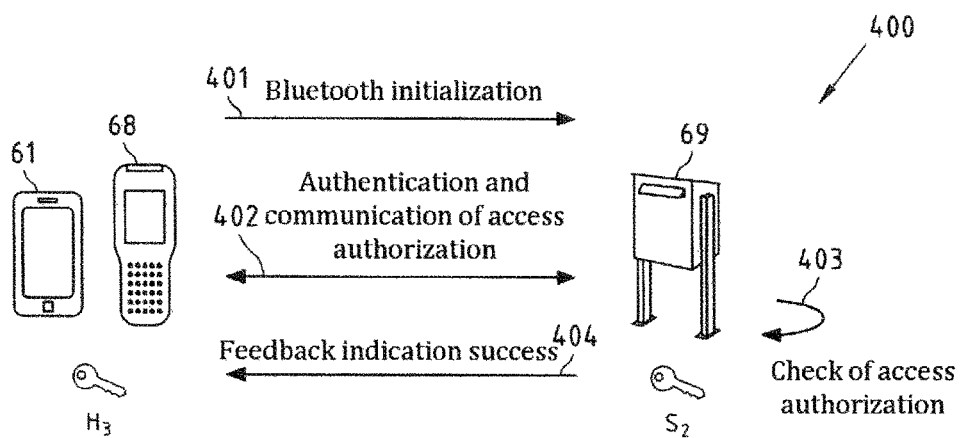
FIG. 4: shows a flow diagram of one exemplary embodiment of a communication of access authorization information between a handheld scanner/cellular phone and a parcel box according to the present invention.

The authenticity and integrity of B and V are then checked in step 503 analogously to the description given with regard to step 403 in FIG. 4, but V is checked either on the basis of S2 (in the case of ILA tokens) or on the basis of ST2 (in the case of GLA tokens). Which key S2/ST2 is intended to be used can be decided on the basis of the structure of the LockID contained in the token, as has already been explained.

With regard, too, to the check of the access authorization parameters contained in B, reference can be made to the description concerning step 403 in FIG. 4, with the difference that the LockID contained in B is compared either with the LockID of the lock (in the case of ILA tokens) or with the GroupID of the lock (in the case of GLA tokens).

The lock is opened if B and V have been found to be authentic and to have integrity, the check of the access authorization parameters in relation to their reference variables present in the lock has proceeded positively and the permissions indicate that opening of at least one door is permissible.

Communication of the Rejection List

In the communication of the rejection list, the token need not authenticate itself, for example. A reply attack cannot be performed on account of the counter (Counter) contained in the rejection list. The distribution of the rejection lists among the locks can preferably be performed by the handheld scanners 68 and the cellular phone 61; however, GLA tokens 74 can also be used for this purpose, which GLA tokens are specifically reprogrammed for this case, such that they can include and communicate rejection lists.

The process 600 for communicating the rejection list by means of ILA tokens (e.g. handheld scanner 68, cellular phone 61 and tag 62) is described below. In this case, the ILA token receives for example the following information from the key server: rejection information L (which contains the rejection list) and fourth check information $V_L$, which is generated for example by cryptographic operations being performed on at least L using $S_1$ (ILA token) or $S_{T1}$ (GLA token).

The process 600 then proceeds as follows. In step 601, the token 61, 68, 74, after a Bluetooth or NFC connection has been set up, communicates the rejection information L and the validation feature $V_L$. In step 602, the lock checks the authenticity of L on the basis of $V_L$ and the key $S_2$ or $S_{T2}$, which are in turn selected on the basis of the structure of the LockID in L. For example the contents of L can then be checked, that is to say e.g. whether the LockID matches the LockID of the lock, and/or whether the value of Counter is greater than the value maintained in the lock for the rejection lists. If this is the case, the new rejection list from L is accepted in the lock (by replacement of the old rejection list) and the value for the rejection lists in the lock is set to the value of Counter from L. In step 603, a feedback indication is then signaled to the token (OK, ERROR, WARNING) (step 603).

The value of Counter ensures that the rejection list cannot be replaced by an old rejection list. Since the rejection list—when it is generated—is complete, the key can replace all previous KeyIDs with the current KeyIDs. In this case, in particular KeyIDs of access authorizations that are no longer valid are removed from the rejection list in order to keep the latter small.

Update of Group Keys

The key S2 that is responsible for the individual access remains constant for example during the complete life cycle of the lock. However, the key ST2 that is responsible for the group access possibly needs to be exchanged once or a number of times (this can occur, for example, if a parcel box is moved to a different delivery area). For this reason, the changeable key ST2 is protected according to the invention by the invariable—and therefore more secure—key S2.

By way of example, handheld scanner 68 and cellular phone 61 are intended to be able to exchange the key ST2 (or, if appropriate, a plurality of keys ST2 present on the lock). For this purpose, the key server 60 creates group key information comprising, for example, one or more components from the following: a LockID, that is to say the ID of the lock to which the update relates, an update_counter as unique counter for the update, and one or more entries, that is to say the group key list with the tuples (GroupID, ST2).

The token 61, 68 then receives from the key server 60 for example a packaged key value W, which encrypts at least the new group key(s) ST2 and respective new GroupIDs using the individual key S1 of the lock (or for example the entire group key information). Thus, the new key ST2 is not present in plain text on the handheld scanner 68 or cellular phone 61 and can be decrypted only by the respective lock. Further, the key server 60 also creates a validation value VW, which is generated for example by cryptographic operations on at least W using the first key S1. The cryptographic operations can in turn constitute for example an MAC function or a digital signature using S1.

Figure 7:
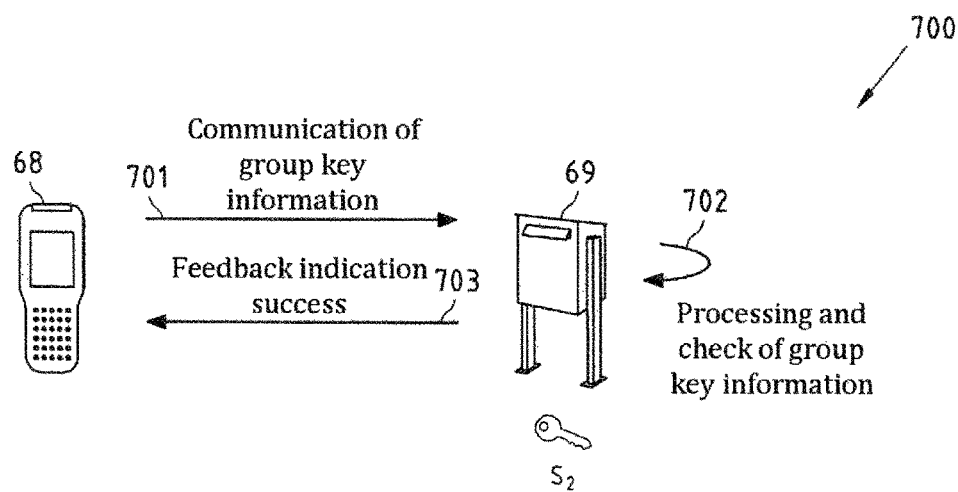
FIG. 7: shows a flow diagram of one exemplary embodiment of a communication of group key information between a handheld scanner/cellular phone/tag and a parcel box according to the present invention.

The communication process 700 illustrated in FIG. 7 then proceeds as follows. In step 701, a token 68 communicates W and VW to the lock. Step 702 then involves evaluating the check information VW in order to determine the authenticity and integrity of W and VW using the key S2. In the event of a positive result, the group key list can be decrypted using the key S2 and further checks can be performed to ascertain whether this group key list is permitted to be accepted in the lock, e.g. on the basis of a check whether the LockID from the group key information (obtained by decryption of W) matches the LockID of the lock, and/or whether the value update_counter from the group key information is greater than the corresponding value of the update-counter for the current group key(s) in the lock. If the checks are successful, the current group key(s) ST2 and the respective GroupID are replaced by the new values from the group key list and the update_counter in the lock is replaced by the value of the update_counter from the group key information. Step 703 then involves signaling the feedback indication to the token (OK/NOK).

In this case, the update_counter in turn prevents replay attacks in which the attacker might attempt to position one or more old group key(s) in the lock. The LockID in the group key information ensures that the update comes from key server 60 and was created for the concrete lock. A further important process step, which is not presented explicitly here, is that the key server 60 receives the return information (for example from the token 68) as to whether or not the new group key(s) were stored in the lock. This information is necessary in order that the key server can generate in the future usable access authorizations for GLA tokens.

Order of the Operations

Figure 11:
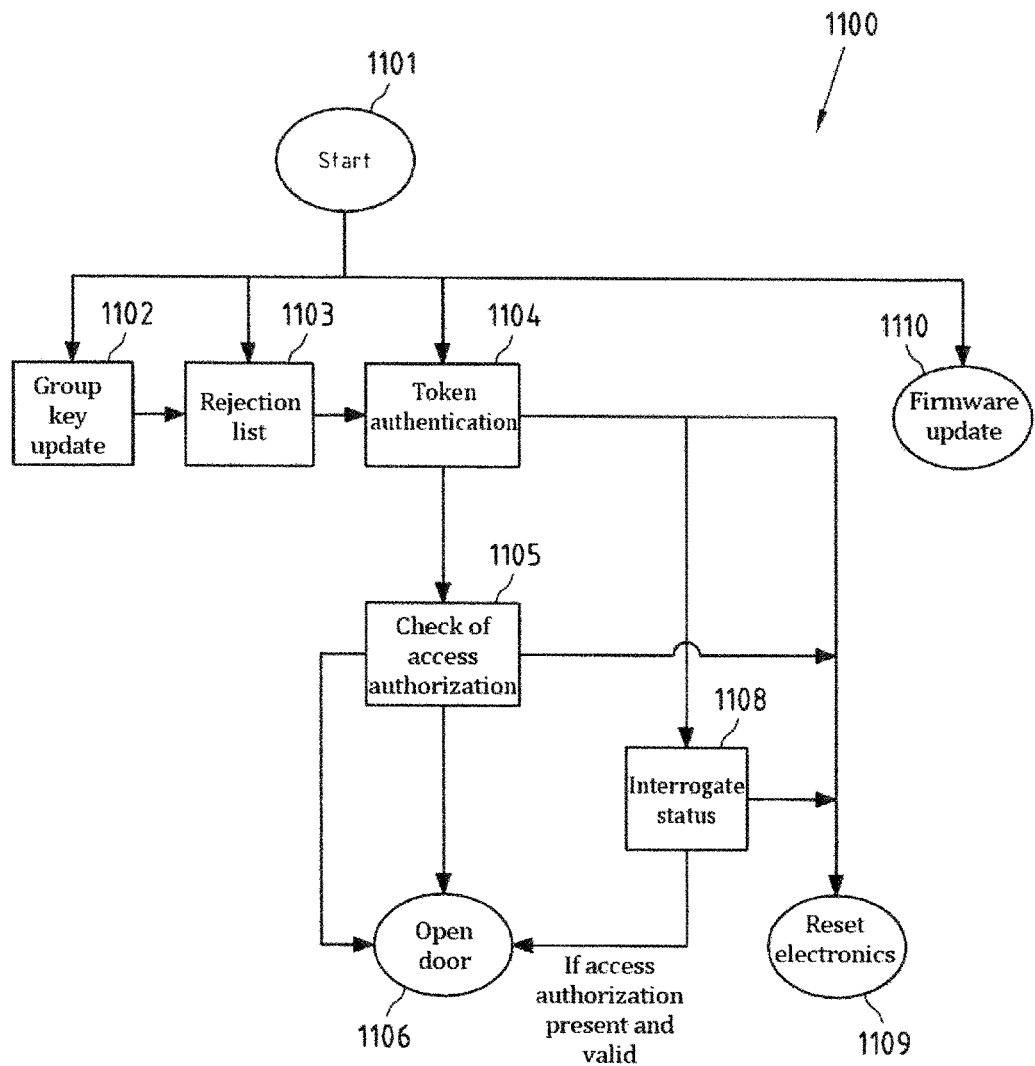
FIG. 11: shows a flow diagram of the possible order of operations in one exemplary embodiment of a parcel box according to the present invention.

FIG. 11 shows an exemplary flow diagram 1100 which illustrates the possible order of operations in a lock according to the invention. What operations are generally intended to be performed by the lock can be communicated to the lock from the token for example by means of one or more commands. In this regard, it is possible, for example, to perform a plurality of operations in a communication session, for example a group key update, an installation of a new rejection list and a check of access authorization in order to bring about opening of the door. Depending on the desired operation, one or more of the above-described values B, V, A, W, $V_W$, L, $V_L$ illustrated in FIG. 1 are then transmitted from the token to the lock.

After the Start 1101, either one or more group keys can be updated on the lock (step 1102), a new rejection list can be installed in the lock (step 1103), a token authentication (with the aid of the key H4) can be performed (step 1104) or a firmware update of the lock software (step 1110) can be performed. As illustrated in FIG. 11, some steps here, e.g. steps 1102, 1103 and 1104, can also be performed one after another. FIG. 11 should be understood such that each operation is optional, in principle, that is to say that for example only step 1102, step 1104 and step 1109 can be performed if so desired. Further, the processing can therefore also be ended after each operation, for example after step 1102.

After successful token authentication 1104, either the electronics can be reset (Reset in step 1109), the status of the lock can be interrogated (step 1108), or a check of an access authorization B obtained can be performed (step 1105). After both steps, a reset can optionally also be performed (step 1109). If the access authorization B provides authorization for example for opening one or more doors of the parcel box 69, said door(s) is/are opened (step 1106). After interrogation of the status (step 1108), too, optionally—given the presence of authorization—the door can be opened (step 1106).

As is evident from FIG. 11, no opening of the door takes place after the reset (step 1109) or the firmware update (step 1110). Further, the installation of the rejection list (step 1102) and the update of the one or the plurality of group keys (step 1102) always takes place before the access authorization check since the rejection list or the group key(s) may be required in this check.

An explanation is given below, for the exemplary embodiment of the access control system in FIG. 3, of how the assignment of the access authorizations and keys to the devices of the deliverers 70 and users 63 and to the parcel boxes 69 is performed.

Delivery Process Using Handheld Scanner

The assignment server 69 performs the so-called area cutting, that is to say dynamically defines delivery areas on the basis of the daily amount of mail and the available delivery personnel. In the context of said area cutting, the parcel boxes 69 belonging to a respective area are identified on the basis of their parcel box address (or the addresses of their users). It is assumed that this assignment is performed dynamically, that is to say that beforehand no statement can be made regarding which parcel boxes 69 will belong to which area.

The master data—described in even greater detail below—of the parcel boxes, which comprise inter alia the access authorizations to the respective parcel boxes and the key H3, and for example also the address data of the parcel box users are then distributed regionally in a plurality of intermediate steps, the intermediate steps being irrelevant to the following considerations. Ultimately, in general one, but if appropriate also a plurality of areas are assigned to a decentralized unit (e.g. a computer or a server) from which the "refueling" of the handheld scanners 68 with the master data (and the address data of the parcel box users) for a chosen area is performed. The mail data (desired data) are likewise transferred to the handheld scanner from the decentralized unit in the context of the refueling.

The assignment of the handheld scanners to an area is performed dynamically and downstream of the area cutting.

The above process can be summarized as follows:

1. Define delivery areas (for example primarily on the basis of the delivery/collection addresses of mail, the amount of mail and the available delivery personnel)

2. Distribute master data of the parcel boxes (and address data of the parcel box users) assigned to the delivery areas among the decentralized units
3. Register deliverer 70 with the handheld scanner 68 at the decentralized unit
4. Deliverer 70 collects parcels for his/her area
5. Deliverer 70 delivers the parcels for the parcel boxes 69 in his/her area If the access authorization is created for a handheld scanner 68, 1 day, for example, is provided as the period of validity. Further, a parameter that limits the maximum number of uses of said access authorization is provided, for example.

Access Authorizations for Handheld Scanners

The key server 60 generates access authorizations B for each lock (of a parcel box 69) together with a respective corresponding validation feature V. Each deliverer 70 is intended to receive, together with the validation features V, access authorizations B for those parcel boxes 69 (i.e. their locks) to which said deliverer is intended to deliver on the day, that is to say those of his/her delivery area.

Figure 8:
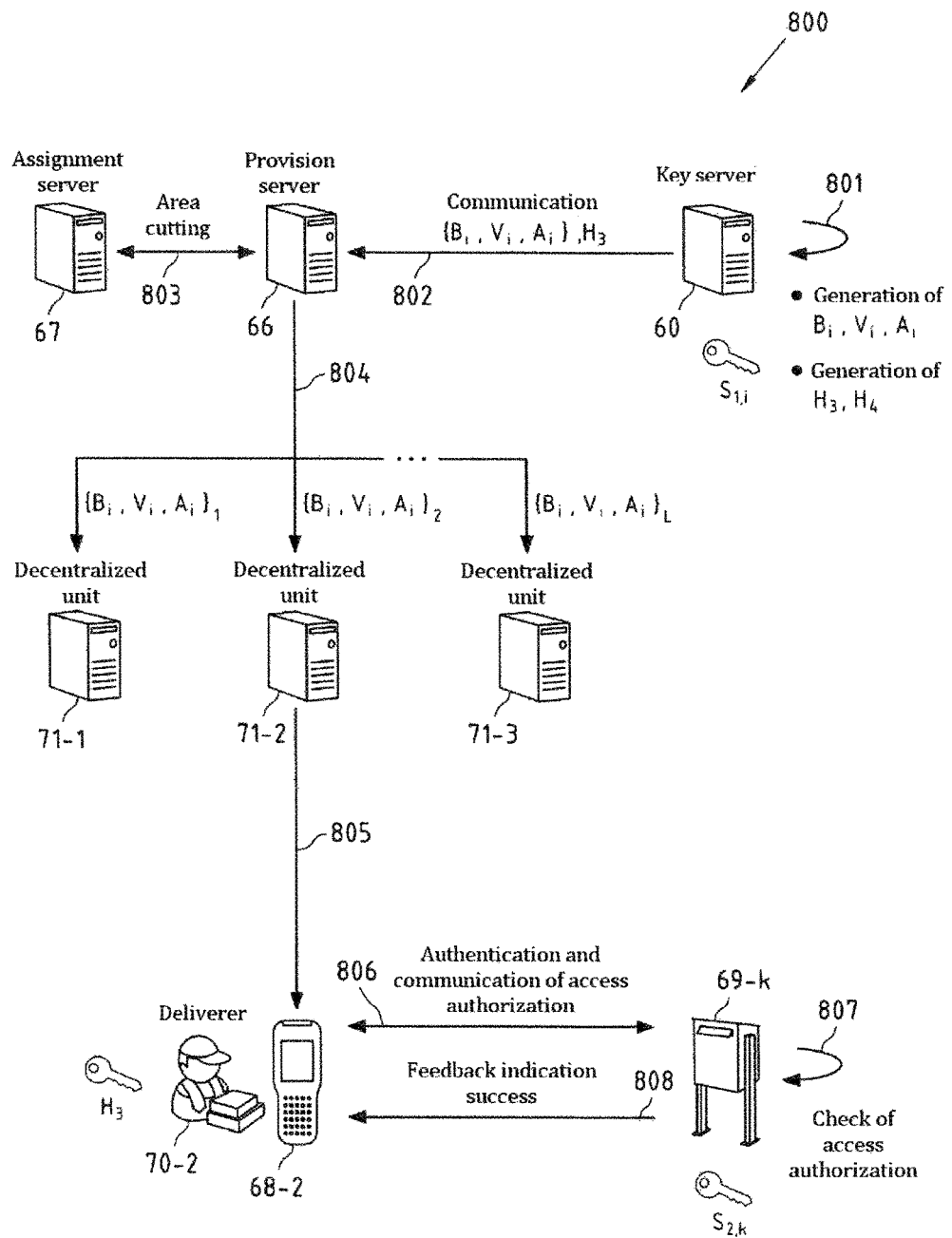
FIG. 8: shows a flow diagram of one exemplary embodiment of a communication of keys and access authorization information between the key server and further components of an exemplary system according to the invention.

FIG. 8 gives an overview of one exemplary process 800 of delivery with access authorizations. The sequence is as follows:

The key server 60 generates in step 801 every day, for example, the access authorizations $B_i$ (wherein the index i= 1 . . . N denotes the respective lock from a total of N locks), which are validated in each case with a corresponding lock key $S_{1,i}$ (which once again together with a key $S_{2,i}$ stored in the lock forms a symmetrical or asymmetrical key). For this purpose, pairs $(B_i, V_i)$ are calculated, wherein $B_i$ is an access authorization and $V_i$ is the associated first check information already described here which is generated using the key $S_{1,i}$. Further, the key server generates e.g. a device key $H_4$ (which together with a further key $H_3$ forms a symmetrical or asymmetrical key pair), with which a handheld scanner 68 can authenticate itself vis-à-vis a lock of a parcel box 69, and encrypts the latter (and for example one or more further parameters, e.g. the KeyID) with the respective lock key $S_{1,i}$, in order to generate an authorization feature $A_i$.

In step 802, all the access authorizations are transmitted e.g. daily (for example in accordance with the generation frequency of the key server 60) from the key server 60 to the provision server 66. In particular, the following master data are transmitted per lock: access authorization $B_i$, validation $V_i$, and authorization feature $A_i$. The LockID can also optionally be contained therein. In the provision server, the master data can be augmented by further information, for example the MAC address of the lock, and/or address information of the parcel box and/or address information of the users of the respective parcel boxes, to give just a few examples. However, such information may also already have been added to the master data at the key server 60. As already mentioned, the MAC address is the Medium Access Control address of the lock, by means of which the lock can be addressed directly for example without the need for Bluetooth pairing. Only the transmission of the plurality of master data sets $\{B_i, V_i, A_i\}$ and of the lock $H_3$ to the provision server is illustrated in step 802 in FIG. 8, for reasons of clarity.

In step 803, the area cutting takes place in the assignment server 67.

In step 804, each of the L decentralized units 71-1 . . . 71-L receives all the access authorizations for the areas assigned to it on this day. This is constituted symbolically by the notation $\{B_i, V_i, A_i\}_l$ in step 804, wherein the index l runs from 1 to L and the notation $\{B_i, V_i, A_i\}_l$ denotes the master data of all the parcel boxes in the area l (wherein once again for reasons of clarity the further master data elements LockID, address information and MAC address are not illustrated and it is assumed that each decentralized unit obtains only the master data of the parcel boxes of a respective delivery area, although this is not mandatory). A decentralized unit then "refuels" one (or else a plurality of) handheld scanner(s) within a delivery area l with the master data $\{B_i, V_i, A_i\}_l$ of the parcel boxes of this delivery area.

A handheld scanner 68-2 (this is, for example, a handheld scanner assigned to the second decentralized unit 71-2 and the delivery area l=2 thereof) obtains, in the context of the refueling, the master data $\{B_i, V_i, A_i\}_2$ of the parcel boxes for the area l=2 to which it was allocated (step 805). This can be performed for example by means of wired communication (e.g. via a docking station which is connected to the decentralized unit 71-2 and into which the handheld scanner 68-2 is placed) and/or wireless communication (e.g. by means of WLAN or GRPS).

In step 806, the handheld scanner 68-2—for the purpose of opening a parcel box 69-k in its area, selected by way of example—with the aid of the MAC address of the lock of said parcel box 69-k determines a Bluetooth connection to the lock and transmits the access authorization $B_k$, the validation information $V_k$, the authorization feature $A_k$ and further validation information, as described with regard to FIG. 4, to the lock (step 806).

In step 807, the lock validates the authorization on the basis of $V_k$ and $S_{2,k}$ (analogously to the description of FIG. 4) and opens in the case of correct authorization. Step 808, finally, involves sending a corresponding status message and for example the battery status back to the handheld scanner.

As is evident from the explanations above, the authentication of the handheld scanner 68-2 vis-à-vis the lock of the parcel box 69-k is performed with the aid of the key $H_3$. No individual device key $H_3$ is assigned to the handheld scanner 68-2. Instead, a group key $H_3$ is generated, wherein all the handheld scanners 68 form the group in this regard and use the same key $H_3$. In the context of the refueling, the group key $H_3$ is transmitted to a handheld scanner. An access authorization for this "group key" $H_3$ is then issued per lock, said access authorization effectively being valid for all the handheld scanners. The key $H_3$ is transmitted for example from the key server 60 to the provision server (step 802), and then to all the decentralized units (step 804), preferably via secure connections, in order to prevent it from being spied out. By way of example, the transmission from the key server 60 to the provision server 66 and/or to the decentralized unit 71-2 is performed in an encrypted manner by means of SSL/TLS. The connection between decentralized unit 71-2 and handheld scanner 68-2 in the refueling should likewise be correspondingly safeguarded.

Blocking of Handheld Scanners

The access authorizations with which the handheld scanners 68 operate are in each case issued anew for example for 1 day. If it is necessary to block a handheld scanner 68, for example after loss of the device, it is necessary to create a rejection list for each lock to which the handheld scanner 68 had access. The rejection list would then have to be brought by means of a kind of "token" to the corresponding locks and loaded therein, but this means a considerable outlay.

This problem is adequately solved by virtue of the fact that the access authorizations B are issued for as narrow a time window as possible (e.g. temporal validity only 1 day) and/or for the fewest possible uses (e.g. a maximum of 3 uses per day). Further or alternatively, the handheld scanner software can restrict the use of the access authorizations as much as possible, for example by the opening of a lock of a parcel box 69 being offered only if a corresponding piece of mail is also present for said parcel box 69 (this can be achieved for example by coordination of the address data (e.g. zip code, street and house number, contained in coded form in the so-called "routing code") of mail with the address data (which are coded for example in a similar form to that in the case of the routing code)—contained in the master data—of parcel boxes 69 and/or the addresses (which are coded for example in a similar form to the case of the routing code) of the users 63 of parcel boxes 69 (by means of which a parcel box 69 can then in turn be uniquely assigned). These addresses are transmitted to the handheld scanner particularly for this purpose). In particular, the situation should also be prevented in which a "blocked" handheld scanner, in particular after loss, on subsequent days is connected to a decentralized unit and refueled.

As a result of this procedure, a dedicated blocking of handheld scanners 68 by means of rejection lists is not absolutely necessary. In particular, the rejection lists that serve for blocking other lost ILA and/or GLA tokens (e.g. cellular phones 61, deliverer tags 74 and user tags 62) then remain smaller, which is advantageous since they have to be stored by the lock. The advantages afforded by rejection lists for the use of cellular phones 61 and, if appropriate, NFC tags 74, 62 (on which the access authorizations have a longer temporal validity than the access authorizations present on the handheld scanners 68) do not exist for the handheld scanners in the case of the procedure described above.

Transmission of the Rejection Lists

As is evident from FIG. 11, the handheld scanner 68 does not have to authenticate itself vis-à-vis the lock in the transmission of a rejection list (step 1103). Accordingly, the limitations that occur with the use of access authorizations (in particular with regard to authentication) do not exist. The rejection lists can be augmented for example per lock as master data in the provision server 66 and can be transmitted to the handheld scanners 68 in refueling. This may have the effect that the opening of a lock takes longer, since, in accordance with FIG. 11, the communication of the rejection list to the lock (step 1103) takes place before the authorization check (step 1105). Since, moreover, the key server 60 has no information about the successful communication of a rejection list to a lock, the current rejection list would be distributed and transmitted in the event of each access to the lock.

The following procedure appears to be advantageous: blockings are performed by a main user, a co-user or on behalf thereof. The rejection lists thereupon generated by the key server 60 are then transmitted to the lock of the parcel box 69 by the corresponding cellular phone. Via the provision server 66, the handheld scanner 68 notifies the key server 60 of the successful or unsuccessful transmission of the rejection list to the lock.

Keys for Delivery Personnel with NFC Tokens

As described in sections, there is a difference between tokens of the ILA type (handheld scanner 68, cellular phone 61, NFC tokens 62 of parcel box users 63) and of the GLA type (NFC tokens 74 of delivery personnel 70). There are various reasons for this differentiation, which are mentioned below:

1. NFC tokens cannot be equipped with access authorizations without a certain outlay.
2. NFC tokens of delivery personnel should be able to open all locks in a specific, in particular static, area.
3. NFC tokens are unable to store many access authorizations.

Requirement (2) makes it clear that delivery personnel 70 should be equipped with an NFC token 74 that is valid in a specific area. For this purpose, a group key $S_{T2}$ that can open a group of locks (and thus parcel boxes 69) is stored on the NFC token 74. As is evident from requirement (3), it is not possible to equip delivery personnel 70 with individual access authorizations for all locks in a specific area.

For this reason, the lock is equipped with two or possibly more (symmetrical or asymmetrical) keys: one key $S_2$ ("individual key", with a corresponding symmetrical or asymmetrical key $S_1$) for interacting with ILA tokens, and one or more keys $S_{T2}$ ("group key", with a corresponding symmetrical or asymmetrical key $S_{T1}$) for operations with the GLA tokens of the delivery personnel 70. The main difference between these keys is that the first-mentioned key $S_2$ is unique for each lock and the further key $S_{T2}$ is shared by a plurality of locks.

While the unique key $S_2$ of the lock is applied during the production process—and is invariable, in particular—the group key $S_{T2}$ can be changed dynamically (e.g. by a handheld scanner 68) during the operating time of the lock.

The exchangeable keys $S_{T2}$ for GLA tokens are described below.

The key server 60 generates an access authorization and provides the latter with validation information in accordance with the corresponding group keys $S_{T1}$ of a respective delivery area. The device keys are applied, together with an access authorization, to the NFC tokens of the delivery personnel.

Figure 9:
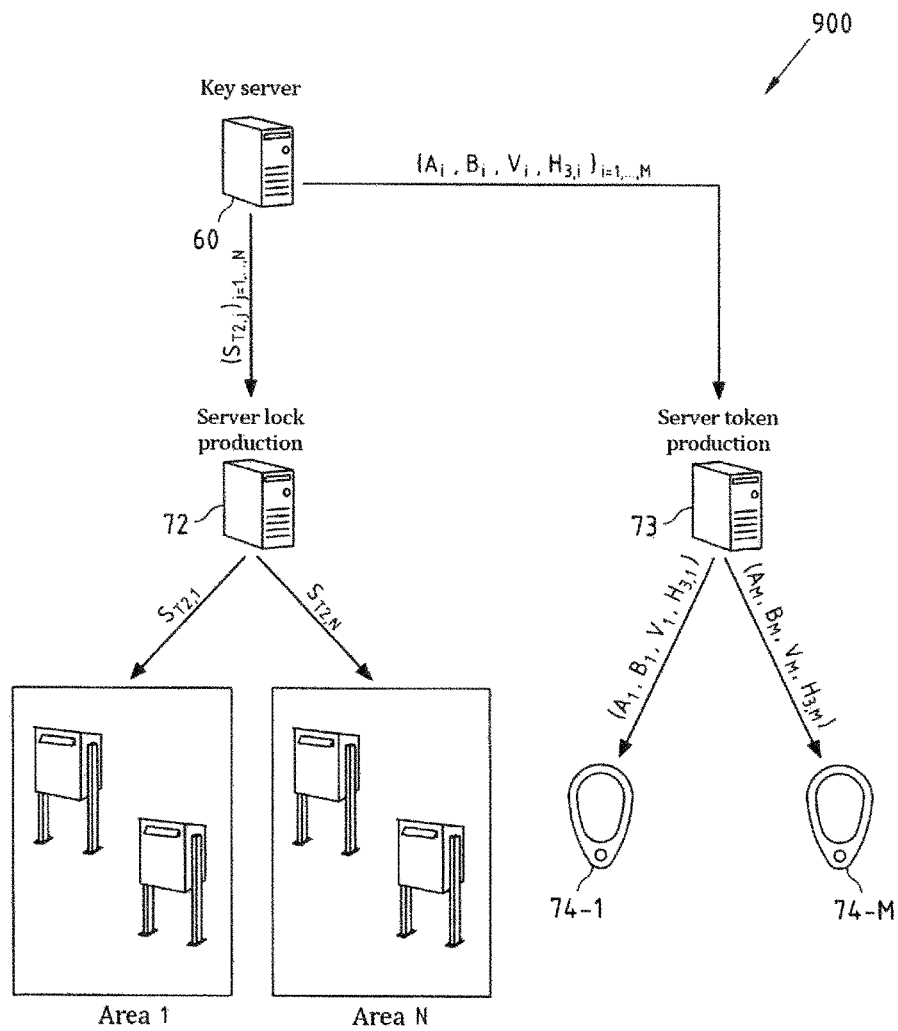
FIG. 9: shows a schematic illustration of the distribution of group keys and access authorization information in an exemplary system according to the invention.

This is illustrated schematically in FIG. 9. Here the NFC tokens (M pieces) 74-1 . . . 74-M are distributed to respective delivery personnel (e.g. via a server of token production 73), in order to be able to open locks in N areas (area 1 . . . area N). Correspondingly, via the server of lock production 72 (or later by means of the update function for group keys), the group keys $S_{T2,1}$ . . . $S_{T2,N}$ are stored in the locks of the parcel boxes of the respective areas 1 . . . N, that is to say group keys $S_{T2,1}$ are stored in the locks of the parcel boxes of area 1, etc.

It is assumed that an NFC token i requires access to all locks in a delivery area j. In this case, the token i requires the following information (data): access authorizations $B_i$; validation feature $V_i$ of the delivery area j (formed by cryptographic operations on Bi using the group key $S_{T1,j}$); authentication value $A_i$, which in turn comprises at least one combination—encrypted using $S_{T1,j}$—of at least the key $H_{4,i}$ and the $KeyID_i$ and for example further comprises the $LockID_j$ that codes the group identifier of the area j. It then holds true that, in a delivery area j (j from 1 to N), any delivery personnel having access authorization for the area j can open every lock using the NFC token of said delivery personnel.

Delivery areas are static in their nature. In this case, requirement (1) must be taken into consideration, which states that it is technically and economically laborious to alter (update) the access authorizations too often. On the other hand, use should not be made of access authorizations which are valid forever, which constitutes an increased security risk. For this reason it is expedient to issue access authorizations for an extended but limited period of time, e.g. a few months or years. After the period of validity has expired, all tokens must be reprogrammed in order to obtain new access authorizations Bi.

Group Keys

In the system in FIG. 3 it may be provided, for example, that letter deliverers use the NFC tags 74 for opening parcel boxes (for example for delivering large-format letters), and that the NFC tags 74 are also used by parcel deliverers at least at times (for example as an alternative to handheld scanners 68). In this case, it should be taken into consideration that delivery areas for deliverers in ZB (standard delivery, delivery bases) and ZSPL (combination delivery, that is to say delivery of letters and parcels) can overlap.

Therefore, there is the possibility that a parcel box sometimes is opened using a tag that "belongs" to one specific delivery area, and sometimes is opened using a different tag that belongs to a different delivery area.

Figure 10:
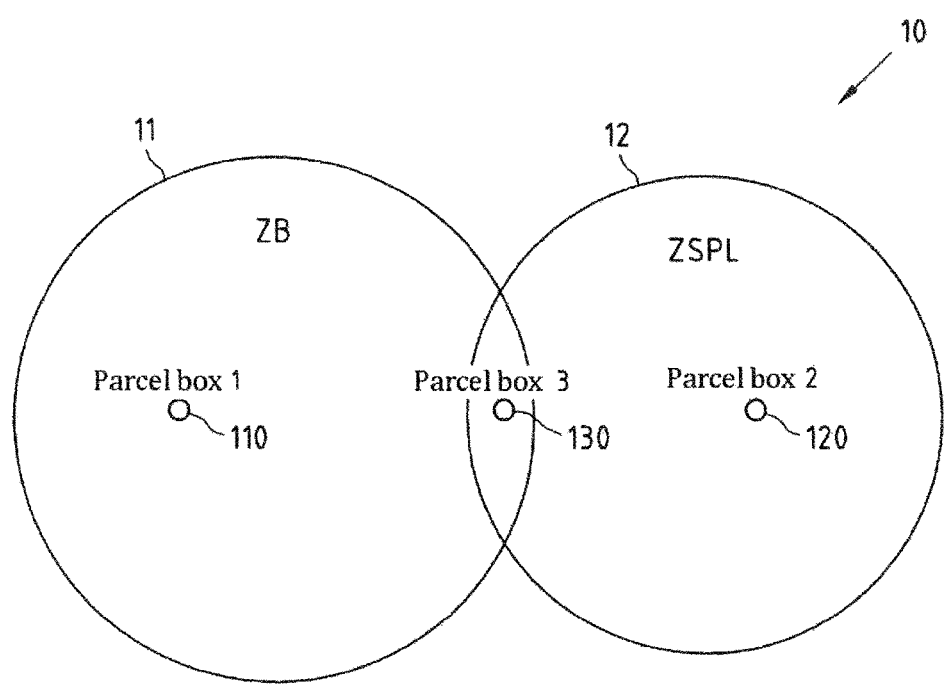
FIG. 10: shows a schematic illustration of the assignment of parcel boxes to different delivery areas in accordance with one exemplary embodiment of the invention.

This is illustrated schematically in FIG. 10. In this case, a first parcel box 110 is assigned only to a first delivery area 11 (ZB), and a second parcel box 120 is assigned to a second delivery area 12 (ZSPL), while a third parcel box 130 is assigned both to the first delivery area 11 and to the second delivery area 12.

This problem can be solved by virtue of the fact that those parcel boxes which are situated in an overlap area (e.g. parcel box 130 in FIG. 10) can obtain two group keys and then grant access for both tags (possibly even more than two, but for example a maximum of five).

Each delivery area (group) has a GroupID (group identifier). The group keys $S_{T2}$ are then stored together with corresponding GroupIDs in the lock: (GroupID$_1$, $S_{T2,1}$), (GroupID$_2$, $S_{T2,2}$), . . .

If the delivery base area ZB 11 has a GroupID GroupZB and the ZSPL 12 has a GroupID GroupZSPL, and $S_{T2,ZB}$ and $S_{T2,ZSPL}$ are the corresponding group keys, then the lock of the parcel box 110 has stored the tuple (GroupZB, $S_{T2,ZB}$), the lock of the parcel box 120 has stored the tuple (GroupZSPL, $S_{T2,ZSPL}$), and the lock of the parcel box 130 has stored both tuples (GroupZB, $S_{T2,ZB}$) and (GroupZSPL, $S_{T2,ZSPL}$). Each of the locks further also has a respective individual key $S_{2,i}$, as has already been described above.

During the authentication phase, a token transmits the LockID, which is also situated in the access authorization for the lock. The LockID gives the lock an instruction (e.g. by means of a coding of predetermined bit positions of the LockID) with regard to which key is intended to be used for the decryption and validation. The LockID indicates either the individual key $S_2$ of the lock or one of potentially a plurality of group keys $S_{T2}$ by virtue of the GroupID being correspondingly coded into the LockID.

In the above example, a deliverer of ZB 11 can open the lock of the parcel box 130 by communicating GroupZB as part of the LockID. Equally, a deliverer of ZSPL 12 can open the lock of the parcel box 130 by communicating GroupZSPL as a part of the LockID. The lock has both keys and can react accordingly.

If a GLA token, e.g. from the area ZB 11, is lost, only the locks of the parcel boxes in the area ZB 11, in particular the parcel boxes 110 and 130, have to receive a corresponding rejection list update. By contrast, the locks of the parcel boxes of ZSPL 12 do not have to be provided with a new rejection list.

Keys H and Access Authorizations of the NFC Token of the Owner

An explanation has already been given of how the key server 60 generates the access authorizations and keys for the handheld scanners 68 and how these access authorizations are transmitted to the handheld scanners 68. The key server 60 also generates the keys and access authorizations for the user 63 of the parcel box, in particular the owner thereof. The user 63 of the parcel box always has an NFC token 62 available, for example. By way of example, the user 63 obtains two NFC tokens 62 for his/her parcel box 69 in the course of an order.

The opening of the lock of the parcel box 69 using an NFC token 62 then proceeds as follows. The key server 60 generates the access authorization B for the NFC token 62, which is validated in each case with a corresponding (lock-specific) key $S_1$. The key $S_1$ together with a key $S_2$ stored in the lock forms a symmetrical or asymmetrical key pair. A pair (B,V) is calculated as already described a number of times, wherein B constitutes an access authorization and V constitutes for example an MAC or a digital signature for the authorization B using the key $S_1$. An authentication feature A is also calculated, which comprises a combination—encrypted using S1—of at least the key H4 and the KeyID and for example further the LockID, wherein $H_4$ together with a key $H_3$ forms a symmetrical or asymmetrical key pair and the key $H_3$ is stored in the token. KeyID is an identifier of the access authorization and LockID codes the individual identifier of the lock. The authorization B and the features V and A and the key $H_3$ are transferred to a programming station. The programming station writes the data B, V, A, $H_3$ to the NFC token(s) 62 of the user 63. For opening the parcel box 69, the NFC token 62 determines a connection to the lock of the parcel box 69, authorizes itself vis-à-vis the lock and transmits the access authorization and validation features (cf. the description concerning FIG. 5). The lock validates the authorization with the aid of the validation features and opens in the case of sufficient authorization.

As exemplary embodiments of the present invention, the following are further intended to be disclosed:

Exemplary Embodiments 1-33: The embodiments defined in claims 1-33.

Exemplary Embodiment 34:

A method for generating access authorization information (B, V), the method comprising generating first check information (V) by performing cryptographic operations on one or more access authorization parameters (B) using at least one first key ($S_1$, $S_{T1}$) of a symmetrical or asymmetrical key pair, generating access authorization information (B, V) comprising at least the one or the plurality of access authorization parameters (B) and the first check information (V), and outputting the access authorization information (B, V) for storage on an access authorization proving apparatus (3) configured to communicate the access authorization information (B, V) to at least one access control apparatus (4) in order to enable the latter to decide whether access is permitted to be granted on the basis of the communicated access authorization information (B, V), wherein necessary conditions for granting access are that first checking, using at least the communicated access authorization parameters (B), the communicated first check information (V) and a second key ($S_2$, $S_{T2}$) of the key pair, said second key being stored in the access control apparatus (4), whether the communicated first check information (V) was generated by performing cryptographic operations on access authorization parameters (B) corresponding to the communicated access authorization parameters (B) using at least the first key ($S_1$, $S_{T1}$) of the key pair, yields a positive result and that it is determined that at least one predefined set of the communicated access authorization parameters (B), in view of respective pieces of reference information present in the access control apparatus (4) at least at the time of the first checking, respectively authorize for access.

Exemplary Embodiment 35:

The method according to exemplary embodiment 34, wherein the key pair is an asymmetrical key pair, wherein generating the first check information (V) comprises generating a digital signature by means of the access authorization parameters (B) using at least the first key of the key pair.

Exemplary Embodiment 36:

The method according to exemplary embodiment 34, wherein the key pair is a symmetrical key pair, and wherein the first checking comprises performing the same cryptographic operations (KRYPT) as are used when generating the first check information (V), on the communicated access authorization parameters (B) using at least the second key ($S_2$, $S_{T2}$) of the key pair for obtaining locally generated first check information and comparing the communicated first check information (V) with the locally generated first check information.

Exemplary Embodiment 37:

The method according to exemplary embodiment 36, wherein the cryptographic operations serve for determining a message authentication code (MAC) as check information (V).

Exemplary Embodiment 38:

The method according to any of exemplary embodiments 34-37, wherein the access control apparatus (4) constitutes an access control apparatus (4) from a plurality of access control apparatuses, wherein a second key ($S_2$) of a symmetrical or asymmetrical individual key pair is stored in the access control apparatus (4), said second key being stored only on the access control apparatus (4), but on none of the other access control apparatuses of the plurality of access control apparatuses, and wherein the first key (S, $S_{T1}$) of the key pair that is used when generating the first check information is the first key ($S_1$) of the individual key pair.

Exemplary Embodiment 39:

The method according to any of exemplary embodiments 34-37, wherein the access control apparatus (4) constitutes an access control apparatus (4) from a plurality of access control apparatuses, wherein a second key ($S_2$) of a symmetrical or asymmetrical individual key pair is stored in the access control apparatus (4), said second key being stored only on the access control apparatus (4), but on none of the other access control apparatuses of the plurality of access control apparatuses, wherein a second key ($S_{T2}$) of a symmetrical or asymmetrical group key pair is further stored in the access control apparatus (4), said second key being different than the second key of the individual key pair and being stored in all the access control apparatuses of a group of access control apparatuses from the plurality of access control apparatuses that comprises the access control apparatus (4), wherein the first key ($S_1$) of the key pair that is used when generating the first check information is either the first key ($S_1$, $S_{T1}$) of the individual key pair or the first key ($S_{T1}$) of the group key pair.

Exemplary Embodiment 40:

The method according to exemplary embodiment 39, wherein at least one second key ($S_{T2}$) of a symmetrical or asymmetrical further group key pair is further stored in the access control apparatus (4), said at least one second key being different than the second key ($S_2$) of the individual key pair and the second key ($S_{T2}$) of the group key pair and being stored in all the access control apparatuses of a further group of access control apparatuses from the plurality of access control apparatuses that comprises the access control apparatus (4), said further group including, however, at least one or more other access control apparatuses in comparison with the group of access control apparatuses, and wherein the second key ($S_2$, $S_{T2}$) of the key pair that is used in the first checking is either the second key ($S_2$) of the individual key pair, the second key ($S_{T2}$) of the group key pair or the second key ($S_{T2}$) of the further group key pair.

Exemplary Embodiment 41:

The method according to either of exemplary embodiments 39-40, wherein provision is not made for changing the second key ($S_2$) of the individual key pair in the access control apparatus (4), for erasing said second key or for exchanging it for another key, but wherein it is provided that the second key ($S_{T2}$) of the group key pair can be changed or erased or exchanged for another key.

Exemplary Embodiment 42:

The method according to any of exemplary embodiments 39-41, further comprising:
  generating group key information (W) comprising at least one second key ($S_{T2}$)—encrypted with the first key ($S_1$) of the individual key pair—of a new symmetrical or asymmetrical group key pair for the same or an at least partly different group of access control apparatuses from the plurality of access control apparatuses,
  outputting the group key information (W) for storage on the access authorization proving apparatus (3), which is configured to communicate the group key information at least to the access control apparatus (4) in order to enable the latter to store in the access control apparatus (4) the second key ($S_{T2}$) of the new group key pair, which second key is obtainable by decryption of the communicated encrypted second key ($S_{T2}$) of the new group key pair using at least the second key ($S_2$) of the individual key pair, such that the second key ($S_2$, $S_{T2}$) of the key pair that is used in the first checking is either the second key ($S_2$) of the individual key pair or the second key ($S_{T2}$) of the new group key pair, Exemplary Embodiment 43:

The method according to exemplary embodiment 42, further comprising:
  generating second check information ($V_W$), and
  outputting the second check information ($V_W$) for storage on the access authorization proving apparatus (3), which is configured to communicate the second check information ($V_W$) at least to the access control apparatus (4), and wherein the second key of the new group key pair, which second key is obtainable by the decryption, is stored in the access control apparatus (4) only under the precondition that, in the case of a check based at least on the communicated second check information ($V_W$), the second key ($S_2$) of the individual key pair and the communicated group key information (W), it is determined that the communicated second check information ($V_W$) was generated by performing cryptographic operations on the group key information corresponding to the communicated group key information (W) using at least the first key ($S_1$) of the individual key pair.

Exemplary Embodiment 44:

The method according to exemplary embodiment 43, wherein the group key information (W) further comprises a counter (update_counter) that is incremented with each new group key pair, and wherein the second key ($S_{T2}$) of the new group key pair that is obtained by the decrypting is stored in the access control apparatus (4) only under the further precondition that a value of a counter (update_counter) comprised by the group key information is greater than a value of a counter provided in the access control apparatus (4), and wherein, in or after the storage of the second key ($S_{T2}$) of the new group key pair in the access control apparatus (4), the value of the counter in the access control apparatus (4) is updated to the value of the counter (update_counter) comprised by the group key information.

Exemplary Embodiment 45:

The method according to either of exemplary embodiments 43-44, wherein the group key information further comprises an individual identifier (LockID) of the access control apparatus (4), and wherein the second key ($S_{T2}$) of the new group key pair that is obtained by the decrypting is stored in the access control apparatus (4) only under the further precondition that an individual identifier (LockID) of the access control apparatus (4) that is stored in the access control apparatus (4) corresponds to the individual identifier (LockID) comprised in the group key information.

Exemplary Embodiment 46:

The method according to any of exemplary embodiments 42-45, wherein the group key information further comprises a group identifier (GroupID) associated with the new group key pair, said group identifier being common to all the access control apparatuses of the group of access control apparatuses for which the new group key pair is intended, and wherein the group identifier (GroupID) obtained by the decrypting is stored in the access control apparatus (4).

Exemplary Embodiment 47:

The method according to any of exemplary embodiments 34-46, wherein one of the access authorization parameters is an identifier (LockID) for only one access control apparatus (4) or a group of access control apparatuses, and wherein it is determined in the access control apparatus (4) that the identifier authorizes for access if the identifier (LockID) corresponds to an individual identifier (LockID) of the access control apparatus (4) that is stored in the access control apparatus (4) and/or a group identifier (GroupID) for a group of access control apparatuses to which the access control apparatus (4) belongs.

Exemplary Embodiment 48:

The method according to any of exemplary embodiments 39-46, wherein one of the access authorization parameters is an identifier (LockID) only for the access control apparatus (4) or a group of access control apparatuses which includes the access control apparatus (4), wherein it is determined in the access control apparatus (4) that the identifier (LockID) authorizes for access if the identifier corresponds to an individual identifier (LockID) of the access control apparatus (4) that is stored in the access control apparatus (4) and/or a group identifier (GroupID) for a group of access control apparatuses to which the access control apparatus (4) belongs, wherein the first check information (V) of access authorization information which has an identifier (LockID) only for the access control apparatus (4) is generated by performing cryptographic operations on the access authorization parameters (B) using at least the first key ($S_1$) of the individual key pair, and wherein the first check information (V) of access authorization information which has an identifier (LockID) for the group of access control apparatuses is generated by performing cryptographic operations on the access authorization parameters using at least the first key ($S_{T1}$) of the group key pair.

Exemplary Embodiment 49:

The method according to exemplary embodiment 48, wherein on the basis of the identifier (LockID), in particular on the basis of a predefined format of the identifier, in the access control apparatus (4), it is possible to identify whether an identifier for only one access control apparatus (4) or an identifier for a group of access control apparatuses is involved, such that either the second key ($S_2$) of the individual key pair or the second key ($S_{T2}$) of the group key pair can be selected in each case appropriately for the first checking.

Exemplary Embodiment 50:

The method according to any of exemplary embodiments 34-49, wherein one of the access authorization parameters (B) is an identifier (KeyID) for the access authorization information (B, V) or for the access authorization proving apparatus (3) which communicates the access authorization information (B, V) to the access control apparatus (4), and wherein it is determined that the identifier (KeyID) authorizes for access if the identifier is not contained in a rejection list (RL) stored in the access control apparatus (4).

Exemplary Embodiment 51:

The method according to any of exemplary embodiments 34-50, further comprising:

encrypting a fourth key ($H_4$) using at least the first key ($S_1$, $S_{T1}$) of the key pair, wherein the fourth key ($H_4$) can be used in an authentication of the access control apparatus (4) vis-à-vis the access authorization proving apparatus (3), which communicates the access authorization information to the access control apparatus (4), or in the checking of the authenticity and/or integrity of information communicated to the access control apparatus (4), generating information (A) comprising at least the encrypted fourth key ($H_4$), and outputting the information (A) for storage on the access authorization proving apparatus (3), which is configured to communicate the information (A) at least to the access control apparatus (4) in order to enable the latter to decrypt the encrypted fourth key using at least the second key ($S_2$, $S_{T2}$) of the key pair and to use said fourth key.

Exemplary Embodiment 52:

The method according to any of exemplary embodiments 34-50, further comprising:

encrypting a combination of a fourth key ($H_4$) and an identifier (KeyID) for the access authorization information (B, V) or for the access authorization proving apparatus (3), which communicates the access authorization information (B, V) to the access control apparatus (4), using at least the first key ($S_1$, $S_{T1}$) of the key pair, wherein the fourth key ($H_4$) can be used in an authentication of the access control apparatus (4) vis-à-vis an access authorization proving apparatus (3), which communicates the access authorization information (B, V) to the access control apparatus, or in the checking of the authenticity and/or integrity of information communicated to the access control apparatus (4), generating information (A) comprising at least the encrypted combination, and outputting the information (A) for storage on the access authorization proving apparatus (3), which is configured to communicate the information (A) at least to the access control apparatus (4) in order to enable the latter to decrypt the encrypted combination using at least the second key ($S_2$, $S_{T2}$) of the key pair, in order to obtain the fourth key ($H_4$) and the identifier, wherein the identifier (KeyID) further constitutes one of the access authorization parameters (B), and wherein it is determined in the access control apparatus (4) that the identifier (KeyID) contained in the communicated access authorization information (B, V) authorizes for access if the identifier (KeyID) contained in the communicated access authorization information (B, V) corresponds to the identifier (KeyID) obtained by decrypting the encrypted combination.

Exemplary Embodiment 53:

The method according to any of exemplary embodiments 34-50, further comprising:

encrypting a combination of a fourth key ($H_4$) and an identifier (KeyID) for the access authorization information (B, V) or for the access authorization proving apparatus (3), which communicates the access authorization information (B, V) to the access control apparatus (4), using at least the first key ($S_1$, $S_{T1}$) of the key pair, wherein the fourth key ($H_4$) can be used in an authentication of the access control apparatus (4) vis-à-vis an access authorization proving apparatus (3), which communicates the access authorization information (B,V) to the access control apparatus (4), or in the checking of the authenticity and/or integrity of information communicated to the access control apparatus (4), generating information (A) comprising at least the encrypted combination, and outputting the information (A) for storage on the access authorization proving apparatus (3), which is configured to communicate the information (A) at least to the access control apparatus (4) in order to enable the latter to decrypt the encrypted combination using at least the second key ($S_2$, $S_{T2}$) of the key pair, in order to obtain the fourth key ($H_4$) and the identifier, wherein the identifier (KeyID) further constitutes one of the access authorization parameters (B), and wherein it is determined in the access control apparatus (4) that the identifier (KeyID) contained in the communicated access authorization information (B, V) authorizes for access if the identifier (KeyID) contained in the communicated access authorization information (B, V) corresponds to the identifier (KeyID) obtained by decrypting the encrypted combination and the identifier (KeyID) is not contained in a rejection list (RL) stored in the access control apparatus (4).

Exemplary Embodiment 54:

The method according to either of exemplary embodiments 52-53, wherein the access authorization information (B, V) communicated to the access control apparatus (4) is stored in identical form on at least two access authorization proving apparatuses (3), wherein the identical access authorization information (B, V) stored on the at least two access authorization proving apparatuses (3) in each case has the same identifier (KeyID) for the access authorization information (B, V) and said access authorization information (B, V) is associated in each case with the same fourth key ($H_4$).

Exemplary Embodiment 55:

The method according to exemplary embodiment 54, wherein the access authorization information (B, V) communicated to the access control apparatus (4) has a limited temporal validity and/or has only a limited permissible number of access processes within its period of validity and/or can be or is only communicated to the access control apparatus (4) by the access authorization proving apparatus (3) if it is determined at the access authorization proving apparatus (3) that there is a need for the access to the access control apparatus (4).

Exemplary Embodiment 56:

The method according to any of exemplary embodiments 51-55, wherein the fourth key ($H_4$) together with a third key ($H_3$) forms a symmetrical or asymmetrical key pair, the method further comprising:

outputting the third key ($H_3$) to the access authorization proving apparatus (3) in order to enable the access authorization proving apparatus (3), by performing cryptographic operations on a challenge (R) generated by the access apparatus, the access authorization parameters (B) and the first check information (V) using at least the third key ($H_3$), to generate third check information (V') and to communicate it to the access control apparatus (4), wherein a further necessary condition for granting access is a second checking, performed on the access control apparatus, using at least the challenge (R), the communicated access authorization parameters (B), the communicated first check information (V), the communicated third check information (V') and the fourth key ($H_4$), reveals that the communicated third check information (V') was generated by performing cryptographic operations on information corresponding to the challenge (R), the communicated access authorization parameters (B) and the communicated first check information (V), using at least the third key ($H_3$).

Exemplary Embodiment 57:

The method according to any of exemplary embodiments 51-55, wherein the access control apparatus (4) can authenticate itself vis-à-vis the access authorization proving apparatus (3) using at least the fourth key ($H_4$), wherein the access authorization information (B, V) is communicated from the access authorization proving apparatus (3) to the access control apparatus (4) only in the event of successful authentication.

Exemplary Embodiment 58:

The method according to either of exemplary embodiments 50 and 53, further comprising:

generating fourth check information ($V_L$) by performing cryptographic operations on rejection information (L) using at least the first key ($S_1$, $S_{T1}$) of the key pair, wherein the rejection information (L) comprises at least one new rejection list (RL) with identifiers (KeyIDs) for access authorization information (B, V) to be rejected or for access authorization proving apparatuses (3) that are to reject access authorization information (B, V) at the access control apparatus (4), and outputting the rejection information (L) and the fourth check information ($V_L$) for storage on the access authorization proving apparatus (3), which is configured to communicate the rejection information (L) and the fourth check information ($V_L$) at least to the access control apparatus (4), wherein the communicated new rejection list (RL) is stored in the access control apparatus (4) only under the precondition that, in the case of a check based at least on the communicated fourth check information ($V_L$), the second key ($S_2$, $S_{T2}$) of the key pair and the communicated rejection information (L), it is determined that the communicated fourth check information ($V_L$) was generated by performing cryptographic operations on the rejection information corresponding to the communicated rejection information (L) using at least the first key ($S_1$, $S_{T1}$) of the key pair.

Exemplary Embodiment 59:

The method according to exemplary embodiment 58, wherein the rejection information (L) further comprises a counter (Counter) that is incremented with each new rejection list (RL), and wherein the new rejection list (RL) is stored in the access control apparatus (4) only under the further precondition that the value of the counter (Counter) comprised by the rejection information (L) is greater than a value of a counter provided in the access control apparatus (4), and wherein the value of the counter of the access control apparatus (4) is updated to the value of the counter (Counter) comprised by the rejection information (L) in or after the storage of the new rejection list (RL) in the access control apparatus (4).

Exemplary Embodiment 60:

The method according to either of exemplary embodiments 58-59, wherein the rejection information (L) further comprises an identifier (LockID) of only one access control apparatus (4) or a group of access control apparatuses on which the new rejection list (RL) is intended to be stored, and wherein the new rejection list (RL) is stored in the access control apparatus (4) only under the further precondition that an individual identifier (LockID) of the access control apparatus (4) that is stored in the access control apparatus (4) or a group identifier (GroupID) for a group of access control apparatuses that contains the access control apparatus (4) corresponds to the identifier comprised in the rejection information.

Exemplary Embodiment 61:

Exemplary Embodiment 62:

Exemplary Embodiment 63:

The method according to any of exemplary embodiments 34-60, wherein one of the access authorization parameters (B) indicates to what extent, in particular to which openings of the access control apparatus (4) or to which openings of an apparatus controlled by the access control apparatus (4), access is intended to be granted.

Exemplary Embodiment 64:

A computer program, comprising program instructions that cause a processor to perform and/or control the method according to any of exemplary embodiments 34 to 63 if the computer program runs on the processor.

Exemplary Embodiment 65:

An access authorization generation apparatus (2), configured to perform and/or control the method according to any of exemplary embodiments 34-63 or comprising respective means for performing and/or controlling the steps of the method according to any of exemplary embodiments 34-63.

Exemplary Embodiment 66:

A method for proving an access authorization, performed by an access authorization proving apparatus (3), the method comprising:

communicating access authorization information (B, V) comprising at least one or more access authorization parameters (B) and first check information (V) to an access control apparatus (4) in order to enable the latter to decide whether access is permitted to be granted on the basis of the communicated access authorization information (B, V), wherein necessary conditions for granting access are that first checking, using at least the communicated access authorization parameters (B), the communicated first check information (V) and a second key ($S_2$, $S_{T2}$) of a symmetrical or asymmetrical key pair, said second key being stored in the access control apparatus (4), whether the communicated first check information (V) was generated by performing cryptographic operations on access authorization parameters (B) corresponding to the communicated access authorization parameters (B) using at least a first key ($S_1$, $S_{T1}$) of the key pair, yields a positive result and that it is determined that at least one predefined set of the communicated access authorization parameters (B), in view of respective pieces of reference information present in the access control apparatus (4) at least at the time of the first checking, respectively authorize for access.

Exemplary Embodiment 67:

The method according to exemplary embodiment 66, wherein the access authorization information (B, V) is generated by an access authorization generation apparatus (2) and stored in the access authorization proving apparatus (3) before the access authorization proving apparatus (3) is issued for the first time to a user of the access authorization proving apparatus (3).

Exemplary Embodiment 68:

The method according to exemplary embodiment 67, wherein the access authorization proving apparatus (3) is a portable RFID or NFC unit, in particular an RFID or NFC tag.

Exemplary Embodiment 69:

The method according to exemplary embodiment 66, wherein the access authorization information (B, V) is generated by an access authorization generation apparatus (2) and communicated to the access authorization proving apparatus (3) via an at least partly wireless communication link, in particular a cellular mobile radio network.

Exemplary Embodiment 70:

The method according to exemplary embodiment 69, wherein the access authorization proving apparatus (3) is a portable terminal configured for wireless communication, in particular a cellular phone.

Exemplary Embodiment 71:

The method according to exemplary embodiment 66, wherein the access authorization information (B, V) is generated by an access authorization generation apparatus (2), is transmitted via a communication network to a computer and, under the control thereof, is communicated to the access authorization proving apparatus (2).

Exemplary Embodiment 72:

The method according to exemplary embodiment 71, wherein the access authorization proving apparatus (3) is a handheld scanner.

Exemplary Embodiment 73:

The method according to any of exemplary embodiments 66-72, wherein communicating information from the access authorization proving apparatus (3) to the access control apparatus (4) is performed wirelessly, in particular by means of RFID, NFC or Bluetooth communication.

Exemplary Embodiment 74:

The method according to any of exemplary embodiments 66-73, wherein the key pair is an asymmetrical key pair, wherein the first check information (V) is generated as a digital signature by means of the access authorization parameters (B) using at least the first key ($S_1$) of the key pair.

Exemplary Embodiment 75:

The method according to any of exemplary embodiments 66-73, wherein the key pair is a symmetrical key pair, and wherein the first checking comprises performing the same cryptographic operations (KRYPT) as are used when generating the first check information (V), on the communicated access authorization parameters (B) using at least the second key ($S_2$, $S_{T2}$) of the key pair for obtaining locally generated first check information and comparing the communicated first check information (V) with the locally generated first check information.

Exemplary Embodiment 76:

The method according to exemplary embodiment 75, wherein the cryptographic operations serve for determining a message authentication code (MAC) as check information (V).

Exemplary Embodiment 77:

The method according to any of exemplary embodiments 66-76, wherein the access control apparatus (4) constitutes an access control apparatus (4) from a plurality of access control apparatuses, wherein a second key ($S_2$) of a symmetrical or asymmetrical individual key pair is stored in the access control apparatus (4), said second key being stored only on the access control apparatus, but on none of the other access control apparatuses of the plurality of access control apparatuses, and wherein the first key ($S_1$, $S_{T1}$) of the key pair that is used when generating the first check information is the first key ($S_1$) of the individual key pair.

Exemplary Embodiment 78:

The method according to any of exemplary embodiments 66-76, wherein the access control apparatus (4) constitutes an access control apparatus (4) from a plurality of access control apparatuses, wherein a second key ($S_2$) of a symmetrical or asymmetrical individual key pair is stored in the access control apparatus (4), said second key being stored only on the access control apparatus, but on none of the other access control apparatuses of the plurality of access control apparatuses, wherein a second key ($S_{T2}$) of a symmetrical or asymmetrical group key pair is further stored in the access control apparatus (4), said second key being different than the second key of the individual key pair and being stored in all the access control apparatuses of a group of access control apparatuses from the plurality of access control apparatuses that comprises the access control apparatus (4), wherein the first key ($S_1$, $S_{T1}$) of the key pair that is used when generating the first check information is either a first key ($S_1$) of the individual key pair or a first key ($S_{T1}$) of the group key pair.

Exemplary Embodiment 79:

The method according to exemplary embodiment 78, wherein at least one second key ($S_{T2}$) of a symmetrical or asymmetrical further group key pair is further stored in the access control apparatus (4), said at least one second key being different than the second key ($S_2$) of the individual key pair and the second key ($S_{T2}$) of the group key pair and being stored in all the access control apparatuses of a further group of access control apparatuses from the plurality of access control apparatuses that comprises the access control apparatus (4), said further group including, however, at least one or more other access control apparatuses in comparison with the group of access control apparatuses, and wherein the second key ($S_2$, $S_{T2}$) of the key pair that is used in the first checking is either the second key ($S_2$) of the individual key pair, the second key ($S_{T2}$) of the group key pair or the second key ($S_{T2}$) of the further group key pair.

Exemplary Embodiment 80:

The method according to either of exemplary embodiments 78-79, wherein provision is not made for changing the second key ($S_2$) of the individual key pair in the access control apparatus (4), for erasing said second key or for exchanging it for another key, but wherein it is provided that the second key ($S_{T2}$) of the group key pair can be changed or erased or exchanged for another key.

Exemplary Embodiment 81:

The method according to any of exemplary embodiments 78-80, further comprising:

communicating group key information (W) comprising at least one second key ($S_{T2}$)—encrypted with the first key ($S_1$) of the individual key pair—of a new symmetrical or asymmetrical group key pair for the same or an at least partly different group of access control apparatuses from the plurality of access control apparatuses, to the access control apparatus (4) in order to enable the latter to store in the access control apparatus (4) the second key ($S_{T2}$) of the new group key pair, which second key is obtainable by decryption of the communicated encrypted second key ($S_{T2}$) of the new group key pair using at least the second key ($S_2$) of the individual key pair, such that the second key ($S_2$, $S_{T2}$) of the key pair that is used in the first checking is either the second key ($S_2$) of the individual key pair or the second key ($S_{T2}$) of the new group key pair, Exemplary Embodiment 82:

The method according to exemplary embodiment 81, further comprising:

communicating second check information ($V_W$) to the access control apparatus, wherein the second key of the new group key pair, which second key is obtainable by the decrypting, is stored in the access control apparatus (4) only under the precondition that, in the case of a check based at least on the communicated second check information ($V_W$), the second key ($S_2$) of the individual key pair and the communicated group key information (W), it is determined that the communicated second check information ($V_W$) was generated by performing cryptographic operations on the group key information corresponding to the communicated group key information (W) using at least the first key ($S_1$) of the individual key pair.

Exemplary Embodiment 83:

The method according to exemplary embodiment 82, wherein the group key information (W) further comprises a counter (update_counter) that is incremented with each new group key pair, and wherein the second key ($S_{T2}$) of the new group key pair that is obtained by the decrypting is stored in the access control apparatus (4) only under the further precondition that a value of a counter (update_counter) comprised by the group key information is greater than a value of a counter provided in the access control apparatus (4), and wherein, in or after the storage of the second key ($S_{T2}$) of the new group key pair in the access control apparatus (4), the value of the counter in the access control apparatus (4) is updated to the value of the counter (update_counter) comprised by the group key information.

Exemplary Embodiment 84:

The method according to either of exemplary embodiments 82-83, wherein the group key information further comprises an individual identifier (LockID) of the access control apparatus (4), and wherein the second key ($S_{T2}$) of the new group key pair that is obtained by the decrypting is stored in the access control apparatus (4) only under the further precondition that an individual identifier (LockID) of the access control apparatus (4) that is stored in the access control apparatus (4) corresponds to the individual identifier (LockID) comprised in the group key information.

Exemplary Embodiment 85:

The method according to any of exemplary embodiments 81-84, wherein the group key information further comprises a group identifier (GroupID) associated with the new group key pair, said group identifier being common to all the access control apparatuses of the group of access control apparatuses for which the new group key pair is intended, and wherein the group identifier (GroupID) obtained by the decrypting is stored in the access control apparatus (4).

Exemplary Embodiment 86:

The method according to any of exemplary embodiments 66-85, wherein one of the access authorization parameters (B) is an identifier (LockID) for only one access control apparatus (4) or a group of access control apparatuses, and wherein it is determined in the access control apparatus (4) that the identifier authorizes for access if the identifier (LockID) corresponds to an individual identifier (LockID) of the access control apparatus (4) that is stored in the access control apparatus (4) and/or a group identifier (GroupID) for a group of access control apparatuses to which the access control apparatus (4) belongs.

Exemplary Embodiment 87:

The method according to any of exemplary embodiments 78-85, wherein one of the access authorization parameters is an identifier (LockID) only for the access control apparatus (4) or a group of access control apparatuses which includes the access control apparatus (4), wherein it is determined in the access control apparatus that the identifier (LockID) authorizes for access if the identifier corresponds to an individual identifier (LockID) of the access control apparatus (4) that is stored in the access control apparatus (4) and/or a group identifier (GroupID) for a group of access control apparatuses to which the access control apparatus (4) belongs, wherein the first check information (V) of access authorization information which has an identifier (LockID) only for the access control apparatus (4) is generated by cryptographic operations being performed by means of the access authorization parameters (B) using at least the first key ($S_1$) of the individual key pair, and wherein the first check information (V) of access authorization information which has an identifier (LockID) for the group of access control apparatuses is generated by performing cryptographic operations on the access authorization parameters using at least the first key ($S_{T1}$) of the group key pair.

Exemplary Embodiment 88:

The method according to exemplary embodiment 87, wherein on the basis of the identifier (LockID), in particular on the basis of a predefined format of the identifier, in the access control apparatus (4), it is possible to identify whether an identifier for only one access control apparatus (4) or an identifier for a group of access control apparatuses is involved, such that either the second key ($S_2$) of the individual key pair or the second key ($S_{T2}$) of the group key pair can be selected in each case appropriately for the first checking.

Exemplary Embodiment 89:

The method according to any of exemplary embodiments 66-88, wherein one of the access authorization parameters (B) is an identifier (KeyID) for the access authorization information (B, V) or for the access authorization proving apparatus (3), and wherein it is determined that the identifier (KeyID) authorizes for access if the identifier is not contained in a rejection list (RL) stored in the access control apparatus (4).

Exemplary Embodiment 90:

The method according to any of exemplary embodiments 66-89, further comprising:
  communicating to the access control apparatus (4) information (A) comprising at least one fourth key ($H_4$) that is encrypted using at least the first key ($S_1$, $S_{T1}$) of the key pair and that can be used in an authentication of the access control apparatus (4) vis-à-vis the access authorization proving apparatus (3), or in the checking of the authenticity and/or integrity of information communicated to the access control apparatus (4), in order to enable the latter to decrypt the encrypted fourth key using at least the second key ($S_2$, $S_{T2}$) of the key pair and to use said fourth key.

Exemplary Embodiment 91:

The method according to any of exemplary embodiments 66-89, further comprising:
  communicating to the access control apparatus (4) information (A) comprising at least one combination—encrypted using at least the first key ($S_1$, $S_{T1}$) of the key pair—of a fourth key ($H_4$) and an identifier (KeyID) for the access authorization information (B, V) or for the access authorization proving apparatus (3), wherein the fourth key ($H_4$) can be used in an authentication of the access control apparatus (4) vis-à-vis the access authorization proving apparatus (3) or in the checking of the authenticity and/or integrity of information communicated to the access control apparatus (4), in order to enable the latter to decrypt the encrypted combination using at least the second key ($S_2$, $S_{T2}$) of the key pair, in order to obtain the fourth key ($H_4$) and the identifier, wherein the identifier (KeyID) further constitutes one of the access authorization parameters (B), and wherein it is determined in the access control apparatus (4) that the identifier (KeyID) contained in the communicated access authorization information (B, V) authorizes for access if the identifier (KeyID) contained in the communicated access authorization information (B, V) corresponds to the identifier (KeyID) obtained by decrypting the encrypted combination.

Exemplary Embodiment 92:

The method according to any of exemplary embodiments 66-89, further comprising:
  communicating to the access control apparatus (4) information (A) comprising at least one combination—encrypted using at least the first key ($S_1$, $S_{T1}$) of the key pair—of a fourth key ($H_4$) and an identifier (KeyID) for the access authorization information (B, V) or for the access authorization proving apparatus (3), wherein the fourth key ($H_4$) can be used in an authentication of the access control apparatus (4) vis-à-vis the access authorization proving apparatus (3) or in the checking of the authenticity and/or integrity of information communicated to the access control apparatus (4), in order to enable the latter to decrypt the encrypted combination using at least the second key ($S_2$, $S_{T2}$) of the key pair, in order to obtain the fourth key ($H_4$) and the identifier, wherein the identifier (KeyID) further constitutes one of the access authorization parameters (B), and wherein it is determined in the access control apparatus (4) that the identifier (KeyID) contained in the communicated access authorization information (B, V) authorizes for access if the identifier (KeyID) contained in the communicated access authorization information (B, V) corresponds to the identifier (KeyID) obtained by decrypting the encrypted combination and the identifier (KeyID) is not contained in a rejection list (RL) stored in the access control apparatus (4).

Exemplary Embodiment 93:

The method according to either of exemplary embodiments 91-92, wherein the access authorization information (B, V) communicated to the access control apparatus (4) is stored in identical form on at least two access authorization proving apparatuses (3), wherein the identical access authorization information (B, V) stored on the at least two access authorization proving apparatuses (3) in each case has the same identifier (KeyID) for the access authorization information (B, V) and said access authorization information (B, V) is associated in each case with the same fourth key ($H_4$).

Exemplary Embodiment 94:

The method according to exemplary embodiment 93, wherein the access authorization information (B, V) communicated to the access control apparatus (4) has a limited temporal validity and/or has only a limited permissible number of access processes within its period of validity and/or can be or is only communicated to the access control apparatus (4) by the access authorization proving apparatus (3) if it is determined at the access authorization proving apparatus (3) that there is a need for the access to the access control apparatus (4).

Exemplary Embodiment 95:

The method according to any of exemplary embodiments 90-94, wherein the fourth key ($H_4$) together with a third key ($H_3$) forms a symmetrical or asymmetrical key pair, the method further comprising:

generating third check information (V') by performing cryptographic operations on a challenge (R) generated by the access apparatus, the access authorization parameters (B) and the first check information (V) using at least the third key ($H_3$), communicating the third check information (V') to the access control apparatus, wherein a further necessary condition for granting access is a second checking, performed at the access control apparatus, using at least the challenge (R), the communicated access authorization parameters (B), the communicated first check information (V), the communicated third check information (V') and the fourth key ($H_4$), reveals that the communicated third check information (V') was generated by cryptographic operations being performed by means of information corresponding to the challenge (R), the communicated access authorization parameters (B) and the communicated first check information (V), using at least the third key ($H_3$).

Exemplary Embodiment 96:

The method according to any of exemplary embodiments 90-94, wherein the access control apparatus (4) can authenticate itself vis-à-vis the access authorization proving apparatus (3) using at least the fourth key ($H_4$), and wherein the access authorization information (B, V) is communicated from the access authorization proving apparatus (3) to the access control apparatus (4) only in the event of successful authentication.

Exemplary Embodiment 97:

The method according to either of exemplary embodiments 89 and 92, further comprising:

generating fourth check information ($V_L$) by performing cryptographic operations on rejection information (L) using at least the first key ($S_1$, $S_{T1}$) of the key pair, wherein the rejection information (L) comprises at least one new rejection list (RL) with identifiers (KeyIDs) for access authorization information (B, V) to be rejected or for access authorization proving apparatuses (3) that are to reject access authorization information (B, V) at the access control apparatus (4), and communicating rejection information (L) comprising at least one new rejection list (RL) with identifiers (KeyID) for access authorization information (B, V) to be rejected or for access authorization proving apparatuses (3) that are to reject access authorization information (B, V) at the access control apparatus (4), and communicating fourth check information ($V_L$) generated by performing cryptographic operations on the rejection information (L) using at least the first key ($S_1$, $S_{T1}$) of the key pair, to the access control apparatus, wherein the communicated new rejection list (RL) is stored in the access control apparatus (4) only under the precondition that, in the case of a check based at least on the communicated fourth check information ($V_L$), the second key ($S_2$, $S_{T2}$) of the key pair and the communicated rejection information (L), it is determined that the communicated fourth check information ($V_L$) was generated by performing cryptographic operations on the rejection information corresponding to the communicated rejection information (L) using at least the first key ($S_1$, $S_{T1}$) of the key pair.

Exemplary Embodiment 98:

The method according to exemplary embodiment 97, wherein the rejection information (L) further comprises a counter (Counter) that is incremented with each new rejection list (RL), and wherein the new rejection list (RL) is stored in the access control apparatus (4) only under the further precondition that the value of the counter (Counter) comprised by the rejection information (L) is greater than a value of a counter provided in the access control apparatus (4), and wherein the value of the counter of the access control apparatus (4) is updated to the value of the counter (Counter) comprised by the rejection information (L) in or after the storage of the new rejection list (RL) in the access control apparatus (4).

Exemplary Embodiment 99:

The method according to either of exemplary embodiments 97-98, wherein the rejection information (L) further comprises an identifier (LockID) of only one access control apparatus (4) or a group of access control apparatuses on which the new rejection list (RL) is intended to be stored, and wherein the new rejection list (RL) is stored in the access control apparatus (4) only under the further precondition that an individual identifier (LockID) of the access control apparatus (4) that is stored in the access control apparatus (4) or a group identifier (GroupID) for a group of access control apparatuses that contains the access control apparatus (4) corresponds to the identifier comprised in the rejection information.

Exemplary Embodiment 100:

The method according to any of exemplary embodiments 66-99, wherein one of the access authorization parameters (B) indicates to what extent, in particular to which openings of the access control apparatus (4) or to which openings of an apparatus controlled by the access control apparatus (4), access is intended to be granted.

Exemplary Embodiment 101:

A computer program, comprising program instructions that cause a processor to perform and/or control the method according to any of exemplary embodiments 66 to 100 when the computer program runs on the processor.

Exemplary Embodiment 102:

An access authorization proving apparatus (3), configured to perform and/or control the method according to any of exemplary embodiments 66-100 or comprising respective means for performing and/or controlling the steps of the method according to any of exemplary embodiments 66-100.

Exemplary Embodiment 103:

A system, comprising:

an access control apparatus (4) according to exemplary embodiment 32, an access authorization generation apparatus (2), in particular according to exemplary embodiment 65, and an access authorization proving apparatus (3), in particular according to exemplary embodiment 102, wherein the access authorization information (B, V) is generated by the access authorization generation apparatus (2) and is communicated to the access control apparatus (4) by the access authorization proving apparatus (3).

The exemplary embodiments of the present invention described by way of example in this specification are intended also to be understood as disclosed in all combinations with one another. In particular, the description of a feature comprised by an embodiment—unless explicitly explained to the contrary—in the present case also ought not be understood to mean that the feature is indispensible or essential for the function of the exemplary embodiment. The sequence of the method steps in the individual flow diagrams as outlined in this specification is not mandatory; alternative sequences of the method steps are conceivable. The method steps can be implemented in various ways; an implementation in software (by program instructions), hardware or a combination of both is thus conceivable for implementing the method steps. Terms used in the patent claims such as "comprise", "have", "include", "contain" and the like do not exclude further elements or steps. The wording "at least partly" includes both the case "partly" and the case "completely". The wording "and/or" is intended to be understood to the effect that the disclosure is intended to include both the alternative and the combination, that is to say "A and/or B" means "(A) or (B) or (A and B)". In the context of this specification, units, persons or the like in the plural mean a plurality of units, persons or the like. The use of the indefinite article does not exclude the plural. An individual device can perform the functions of a plurality of units or devices mentioned in the patent claims. Reference signs indicated in the patent claims should not be regarded as limitations of the means and steps used.

The invention claimed is:

1. An access control apparatus comprising at least one processor and at least one memory that includes program code, wherein the memory and the program code are configured to cause the access control apparatus with the at least one processor to perform and/or control:
   an obtaining of access authorization information communicated to the access control apparatus and comprising at least one or more access authorization parameters and first check information;
   a first checking, using at least the communicated access authorization parameters, of the communicated first check information and a second key of a symmetrical or asymmetrical key pair, said second key being stored in the access control apparatus, as to whether the communicated first check information was generated by performing cryptographic operations on access authorization parameters corresponding to the communicated access authorization parameters using at least a first key of the key pair;
   a deciding whether access is permitted to be granted, wherein necessary conditions for granting access are that the first checking yields a positive result and that it is determined that at least one predefined set of the communicated access authorization parameters, in view of respective pieces of reference information present in the access control apparatus at least at the time of the first checking, respectively authorize for access; and
      wherein the memory and the program code are further configured to cause the access control apparatus with the at least one processor to perform and/or control action group A or action group B as defined below:
   action group A:
      an obtaining of information communicated to the access control apparatus and comprising at least one fourth key encrypted using at least the first key of the key pair and usable in an authentication of the access control apparatus vis-á-vis an access authorization proving apparatus that communicates the access authorization information to the access control apparatus, or in the check of the authenticity and/or integrity of information communicated to the access control apparatus; and
      a decrypting of the encrypted fourth key using at least the second key of the key pair in order to obtain the fourth key;
   action group B:
      an obtaining of information communicated to the access control apparatus and comprising at least one combination—encrypted using at least the first key of the key pair—of a fourth key and an identifier for the access authorization information or for an access authorization proving apparatus that communicates the access authorization information to the access control apparatus, wherein the fourth key is usable in an authentication of the access control apparatus vis-á-vis an access authorization proving apparatus that communicates the access authorization information to the access control apparatus, or in the check of the authenticity and/or integrity of information communicated to the access control apparatus; and
      a decrypting of the encrypted combination using at least the second key of the key pair in order to obtain the fourth key and the identifier, wherein the identifier further constitutes one of the communicated access authorization parameters, and wherein it is determined that the identifier contained in the communicated access authorization information authorizes for access if the identifier contained in the communicated access authorization information corresponds to the identifier obtained by decrypting the encrypted information or if the identifier contained in the communicated access authorization information corresponds to the identifier obtained by decrypting the encrypted information and the identifier is not contained in a rejection list stored in the access control apparatus.

2. The access control apparatus as claimed in claim 1, wherein the key pair is a symmetrical key pair, and wherein the first checking comprises performing the cryptographic operations on the communicated access authorization parameters using at least the second key of the key pair for obtaining locally generated first check information and comparing the communicated first check information with the locally generated first check information.

3. The access control apparatus as claimed in claim 2, wherein the cryptographic operations serve for determining a message authentication code as check information.

4. The access control apparatus as claimed in claim 1, wherein one of the communicated access authorization parameters is an identifier for only one access control apparatus or a group of access control apparatuses, and wherein it is determined that the identifier authorizes for access if the identifier corresponds to an individual identifier of the access control apparatus that is stored in the access control apparatus and/or a group identifier for a group of access control apparatuses to which the access control apparatus belongs.

5. The access control apparatus as claimed in claim 1, wherein the memory and the program code are configured to cause the access control apparatus with the at least one processor to perform and/or control action group A, and wherein one of the communicated access authorization parameters is an identifier for the access authorization information or for an access authorization proving apparatus which communicates the access authorization information to the access control apparatus, and wherein it is determined that the identifier authorizes for access if the identifier is not contained in a rejection list stored in the access control apparatus.

6. The access control apparatus as claimed in claim 5, wherein the memory and the program code are further configured to cause the access control apparatus with the at least one processor to perform and/or control:
an obtaining of rejection information communicated to the access control apparatus and comprising at least one new rejection list with identifiers for access authorization information to be rejected or for access authorization proving apparatuses from which access authorization information is to be rejected at the access control apparatus, and fourth check information, and
a storing of the communicated new rejection list only under the precondition that it is determined in a check based at least on the communicated fourth check information, the second key of the key pair and the communicated rejection information, that the communicated fourth check information was generated by performing cryptographic operations on the rejection information corresponding to the communicated rejection information using at least the first key of the key pair.

7. The access control apparatus as claimed in claim 6, wherein the rejection information further comprises a counter that is incremented with each new rejection list, and wherein the new rejection list is stored in the access control apparatus only under the further precondition that the value of the counter comprised by the rejection information is greater than a value of a counter provided in the access control apparatus, and wherein the value of the counter of the access control apparatus is updated to the value of the counter comprised by the rejection information in or after the storage of the new rejection list in the access control apparatus.

8. The access control apparatus as claimed in claim 6, wherein the rejection information further comprises an identifier of only one access control apparatus or a group of access control apparatuses on which the new rejection list is intended to be stored, and wherein the new rejection list is stored in the access control apparatus only under the further precondition that an individual identifier of the access control apparatus that is stored in the access control apparatus or a group identifier for a group of access control apparatuses that contains the access control apparatus corresponds to the identifier comprised in the rejection information.

9. The access control apparatus as claimed in claim 1, wherein the memory and the program code are configured to cause the access control apparatus with the at least one processor to perform and/or control action group B, and wherein the access authorization information communicated to the access control apparatus is stored in identical form on at least two access authorization proving apparatuses, wherein the identical access authorization information stored on the at least two access authorization proving apparatuses in each case has the same identifier for the access authorization information and said access authorization information is associated in each case with the same fourth key.

10. The access control apparatus as claimed in claim 9, wherein the access authorization information communicated to the access control apparatus has a limited temporal validity and/or has only a limited permissible number of access processes within its period of validity and/or can be or is only communicated to the access control apparatus by the access authorization proving apparatus if it is determined at the access authorization proving apparatus that there is a need for the access to the access control apparatus.

11. The access control apparatus as claimed in claim 1, wherein the fourth key together with a third key forms a symmetrical or asymmetrical key pair, and wherein the communicated access authorization information further comprises third check information, wherein the memory and the program code are further configured to cause the access control apparatus with the at least one processor to perform and/or control:
a second checking, using at least a challenge generated by the access control apparatus, of the communicated access authorization parameters, the communicated first check information, the communicated third check information and the fourth key, whether the communicated third check information was generated by performing cryptographic operations on information corresponding to the generated challenge, the communicated access authorization parameters and the communicated first check information, using at least the third key,
wherein a further necessary condition for granting the access is that the second checking yields a positive result.

12. The access control apparatus as claimed in claim 1, wherein the memory and the program code are further configured to cause the access control apparatus with the at least one processor to perform and/or control:
an authenticating vis-á-vis an access authorization proving apparatus that includes the access authorization information, using at least the fourth key, wherein the access authorization information is communicated to the access control apparatus by the access authorization proving apparatus only in the event of successful authentication.

13. The access control apparatus as claimed in claim 1, wherein the memory and the program code are configured to cause the access control apparatus with the at least one processor to perform and/or control action group A.

14. The access control apparatus as claimed in claim 1, wherein the memory and the program code are configured to cause the access control apparatus with the at least one processor to perform and/or control action group B.

15. An apparatus comprising at least one processor and at least one memory that includes program code, wherein the memory and the program code are configured to cause the apparatus with the at least one processor to perform and/or control:
a generating of first check information by performing cryptographic operations on one or more access authorization parameters using at least a first key of a symmetrical or asymmetrical key pair;
a generating of access authorization information comprising at least the one or more access authorization parameters and the first check information; and
an outputting of the access authorization information for storage on an access authorization proving apparatus configured to communicate the access authorization information to at least one access control apparatus in order to enable the latter to decide whether access is permitted to be granted on the basis of the communicated access authorization information, wherein necessary conditions for granting access are that a first checking, using at least the communicated access authorization parameters, the communicated first check information and a second key of the key pair, said second key being stored in the access control apparatus, whether the communicated first check information was generated by performing cryptographic operations on access authorization parameters corresponding to the communicated access authorization parameters using at least the first key of the key pair, yields a positive result and it is determined that at least one predefined set of the communicated access authorization parameters , in view of respective pieces of reference information present in the access control apparatus at least at the time of the first checking, respectively authorize for access;

wherein the memory and the program code are further configured to cause the apparatus with the at least one processor to perform and/or control action group A or action group B as defined below:

action group A:

an encrypting of a fourth key using at least the first key of the key pair, wherein the fourth key can be used in an authentication of the access control apparatus vis-á-vis the access authorization proving apparatus, which communicates the access authorization information to the access control apparatus, or in the checking of the authenticity and/or integrity of information communicated to the access control apparatus,;

a generating of information comprising at least the encrypted fourth key; and an outputting of the information for storage on the access authorization proving apparatus, which is configured to communicate the information at least to the access control apparatus in order to enable the latter to decrypt the encrypted fourth key using at least the second key of the key pair and to use said fourth key;

action group B:

an encrypting of a combination of a fourth key and an identifier for the access authorization information or for the access authorization proving apparatus, which communicates the access authorization information to the access control apparatus, using at least the first key of the key pair, wherein the fourth key can be used in an authentication of the access control apparatus vis-a-vis an access authorization proving apparatus, which communicates the access authorization information to the access control apparatus, or in the checking of the authenticity and/or integrity of information communicated to the access control apparatus, a generating of information comprising at least the encrypted combination, and an outputting of the information for storage on the access authorization proving apparatus, which is configured to communicate the information at least to the access control apparatus in order to enable the latter to decrypt the encrypted combination using at least the second key of the key pair, in order to obtain the fourth key and the identifier, wherein the identifier further constitutes one of the access authorization parameters, and wherein it is determined in the access control apparatus that the identifier contained in the communicated access authorization information authorizes for access if the identifier contained in the communicated access authorization information corresponds to the identifier obtained by decrypting the encrypted combination, or if the identifier contained in the communicated access authorization information corresponds to the identifier obtained by decrypting the encrypted combination and the identifier is not contained in a rejection list stored in the access control apparatus.

16. The access control apparatus as claimed in claim 15, wherein the memory and the program code are configured to cause the apparatus with the at least one processor to perform and/or control action group A.

17. The access control apparatus as claimed in claim 15, wherein the memory and the program code are configured to cause the apparatus with the at least one processor to perform and/or control action group B.

18. An apparatus comprising at least one processor and at least one memory that includes program code, wherein the memory and the program code are configured to cause the apparatus with the at least one processor to perform and/or control:

a communicating of access authorization information comprising at least one or more access authorization parameters and first check information to an access control apparatus in order to enable the latter to decide whether access is permitted to be granted on the basis of the communicated access authorization information, wherein necessary conditions for granting access are that a first checking, using at least the communicated access authorization parameters, the communicated first check information and a second key of a symmetrical or asymmetrical key pair, said second key being stored in the access control apparatus, whether the communicated first check information was generated by performing cryptographic operations on access authorization parameters corresponding to the communicated access authorization parameters using at least a first key of the key pair, yields a positive result and it is determined that at least one predefined set of the communicated access authorization parameters , in view of respective pieces of reference information present in the access control apparatus at least at the time of the first checking, respectively authorize for access;

wherein the memory and the program code are further configured to cause the apparatus with the at least one processor to perform and/or control action group A or action group B as defined below:

action group A:

a communicating to the access control apparatus of information comprising at least one fourth key that is encrypted using at least the first key of the key pair and that can be used in an authentication of the access control apparatus vis-a-vis the access authorization proving apparatus, or in the checking of the authenticity and/or integrity of information communicated to the access control apparatus, in order to enable the latter to decrypt the encrypted fourth key using at least the second key of the key pair and to use said fourth key;

action group B:

a communicating to the access control apparatus of information comprising at least one combination— encrypted using at least the first key of the key pair—of a fourth key and an identifier for the access authorization information or for the access authorization proving apparatus, wherein the fourth key can be used in an authentication of the access control apparatus vis-a-vis the access authorization proving apparatus or in the checking of the authenticity and/or integrity of information communicated to the access control apparatus, in order to enable the latter to decrypt the encrypted combination using at least the second key of the key pair, in order to obtain the fourth key and the identifier, wherein the identifier further constitutes one of the access authorization parameters, and wherein it is determined in the access control apparatus that the identifier contained in the communicated access authorization information authorizes for access if the identifier contained in the communicated access authorization information corresponds to the identifier obtained by decrypting the encrypted combination, or if the identifier contained in the communicated access authorization information corresponds to the identifier obtained by decrypting the encrypted combination and the identifier is not contained in a rejection list stored in the access control apparatus.

19. The access control apparatus as claimed in claim 18, wherein the memory and the program code are configured to cause the apparatus with the at least one processor to perform and/or control action group A.

20. The access control apparatus as claimed in claim 18, wherein the memory and the program code are configured to cause the apparatus with the at least one processor to perform and/or control action group B.

* * * * *